July 21, 1964

N. ROCHESTER

MEMORY SYSTEM 3,141,980

Filed Aug. 21, 1961

12 Sheets-Sheet 1

INVENTOR
NATHANIEL ROCHESTER

BY Elmer Galbi

AGENT

July 21, 1964 N. ROCHESTER 3,141,980

MEMORY SYSTEM

Filed Aug. 21, 1961 12 Sheets-Sheet 3

July 21, 1964 N. ROCHESTER 3,141,980

MEMORY SYSTEM

Filed Aug. 21, 1961 12 Sheets-Sheet 4

July 21, 1964 N. ROCHESTER 3,141,980

MEMORY SYSTEM

Filed Aug. 21, 1961 12 Sheets-Sheet 5

July 21, 1964 N. ROCHESTER 3,141,980

MEMORY SYSTEM

Filed Aug. 21, 1961 12 Sheets-Sheet 8

July 21, 1964 N. ROCHESTER 3,141,980

MEMORY SYSTEM

Filed Aug. 21, 1961 12 Sheets-Sheet 9

July 21, 1964 N. ROCHESTER 3,141,980

MEMORY SYSTEM

Filed Aug. 21, 1961 12 Sheets-Sheet 10

July 21, 1964 N. ROCHESTER 3,141,980

MEMORY SYSTEM

Filed Aug. 21, 1961 12 Sheets-Sheet 11

United States Patent Office 3,141,980
Patented July 21, 1964

3,141,980

MEMORY SYSTEM

Nathaniel Rochester, Mount Kisco, N.Y., assignor to International Business Machines Corporation, New York, N.Y., a corporation of New York Filed Aug. 21, 1961, Ser. No. 132,895
8 Claims. (Cl. 307—88.5)

This invention relates to data memories and more particularly to means for addressing high speed data memories.

The switching time of the gating device used in memory addressing circuitry is decreased as the fan out, that is, the number of other devices which each device drives, is increased. Hence, in a high speed memory each switching device in the memory addressing circuitry must have a limited fan out. If the memory has a large number of storage positions (a multibit memory system), the limited fan out requirement necessitates the use of a multistage addressing circuit.

Multibit memory systems utilize three different types of signals. The first signal indicates whether information is to be read from or stored in the memory and is normally termed a "read-write" signal; the second signal indicates where information is to be stored or read from and is normally termed an "address"; and the third signal indicates what information (a "zero" or a "one" in a binary system, a "zero" or a "one" or a "two" in a ternary system, etc.) is to be stored and is usually termed "data."

In the memory systems known in the prior art the data and the read-write signals are treated separately and differently from the way the address is treated. Separate addressing circuitry is provided to address the individual storage devices, and separate circuitry is provided to supply the data information to the storage devices. For instance, the inhibit lines in magnetic core memory systems supply data information. If a memory system (wherein the number of storage devices exceeds the fan out limitation of the individual switching devices) has separate circuitry to supply the data information to the various storage devices and separate circuitry to address the various storage devices, large numbers of switching devices are needed. The present invention combines the data information, the address information and the read-write signals in one selection or addressing circuit, the data bits and the read-write signals being treated as part of the address. The result is a simple, inexpensive, reliable, high speed memory system.

Each stage of selector or addressing circuitry requires a certain period of time in order to operate and in the systems known in the prior art the time required to access memory is the sum of the time periods required by the various stages of addressing circuitry plus the time required by the separate circuitry which introduces the read-write signals and the data signals. The present invention provides a memory system with a multistage addressing circuit which does not have separate circuitry to introduce read-write signals and data signals, and wherein the time delay between successive memory accesses is only a fraction of the total delay introduced by all the stages of the addressing circuitry.

The increase in speed is made possible by having separately timed resets for the various stages of the addressing circuitry. The addressing signals are initially applied to the first stage of the addressing circuitry and these signals require a certain period of time to propagate through the first stage of circuitry and arrive at the second stage of the addressing circuits. Likewise, further delays are introduced as the various signals progress through each stage of the addressing circuits. Once the first address has progressed through the first stage of the addressing circuitry and reached one of the more advanced stages, the first stage is reset and conditioned to receive a second address. Likewise each other stage of the addressing circuitry is reset after an address has progressed through the particular stage to a more advanced stage. After a stage of the addressing circuitry is reset, the particular stage can receive another set of signals. Hence, a plurality of sets of signals, i.e., a plurality of addresses, can be sequentially introduced into the first stage of circuitry before the first address which was introduced into the first stage of circuitry has had sufficient time to progress through all of the stages of the addressing circuitry. In this manner several addresses can be simultaneously progressing through the various stages of the addressing circuitry. Since the data information and the address are combined in the addressing circuitry, there is no problem in insuring that all the required signals arrive at a particular memory location simultaneously.

The present invention also has further novel features which further increase the speed and reliability of the memory system and at the same time decrease the cost and size of the system. One of the other novel features is a novel logical arrangement of switching circuitry to address a particular type of storage device.

The novel logical arrangement of switching circuitry is for use in a memory system such as the one shown herein which has three system input means; the first system input means designates a particular storage device wherein information is to be stored or from which information is to be read. This input consists of a plurality of digits which form an address. The second system input specifies whether the particular memory storage device is to be read into or read out of (a read-write signals); and the third system input specifies whether a "zero" or "one" is to be written into the particular storage device (a data bit).

The individual bistable storage devices which the novel logical arrangement of switching circuitry is adapted to address have four inputs. The first input is a select input which conditions the particular bistable storage device to receive a bit of data; the second input is a write-one input which is effective to write a "one" in the particular storage device; the third input is a write-zero input which is effective to write a "zero" in the particular storage device; and the fourth input is a read out input which is effective to read out the particular storage device.

The novel logical arrangement of interconnected switching circuitry which addresses the individual storage devices comprises two sections. The first section of this addressing circuitry receives inputs from the second system input means which provides a read-write signal; the third system input means which provides a data bit, and from a plurality of the bit positions of the first system input means which provides an address. This first section of the memory addressing circuitry activates either the write-one or the write-zero lines of a plurality of bit storage devices whenever the read-write signal indicates that a write operation is to be performed. Furthermore it activates one input to a matrix decoder the output of which activates the read lines of the various bit storage devices in accordance with the read-write signal and with the address signal. The second section of the addressing circuitry receives inputs from the first system input means and specifically from the digital positions of the address not supplied to the first section of the addressing circuitry. The second section of the addressing circuitry activates the select lines in a plurality of bit storage devices; and it also provides a second input to the decoder which activates the read lines of the various storage devices.

The broad principles of the present invention as enumerated above have been advantageously applied to binary cryogenic memory systems. For this reason a high speed binary cryogenic memory system is disclosed herein which includes among other features a novel cryogenic switching device which is particularly suited to realize high speeds and reliable operation in accordance with the principles of this invention.

The novel cryogenic switch device of the present invention has a small ratio of inductance to resistance, hence, a small time constant which makes the circuitry capable of very fast operation. The structure of the switching device is such that the delay introduced by each switching device is constant irrespective of which particular inputs to the switching devices are activated. Furthermore, the novel switching device allows the memory addressing circuitry to be packaged in a compact configuration which can be easily manufactured.

The novel switching device of the present invention has a plurality of superconductive input lines on one side of a ground plane and a plurality of superconducting output lines on the other side of the ground plane. Each input line is coupled by induction to one or more superconducting control loops located on the same side of the ground plane as the output lines. The control loops are utilized as the controls for in-line cryotrons which have their gate conductors located in the output lines. The novel construction of this selector switch allows each of the input lines and the output lines to be identical in length thereby providing a uniform switching time irrespective of which particular inputs are activated. A detailed description of the characteristics of the in-line cryotrons and the inductive coupling used in the selector switch is given in: copending application Serial No. 112,373 filed by Brennemann and Meyers on May 24, 1961, entitled "Superconductive Storage Circuits" and copending application Serial No. 132,961 entitled "Transformer Coupler," filed August 21, 1961 by R. L. Garwin.

It is an object of the present invention to provide an improved high speed memory system.

A further object of the present invention is to provide an improved high speed cryogenic memory system.

Yet another object of the present invention is to provide an improved means of addressing a memory system.

Yet another object of the present invention is to provide a cryogenic memory system which has a short access time.

It is still another object of the present invention to provide a cryogenic memory addressing circuit which is self-synchronized.

Another object of the present invention is to provide an improved cryogenic switching device.

Still another object of the present invention is to provide a cryogenic switching device with a small ratio of inductance to resistance.

Still another object of the present invention is to provide a cryogenic switching device adapted to be packaged in a compact array.

It is a further object of the present invention to provide a cryogenic selector switch which can easily be constructed by the vapor deposition process.

It is another object to provide a cryogenic switching device which has a constant switching time.

It is a further object of the present invention to provide a cryogenic selector switch with a plurality of input lines which has a uniform time delay between application of the input and the production of output signals irrespective of which particular input lines are activated.

It is a further object of the present invention to provide a cryogenic selector switch wherein the input and output lines are orthogonal.

A further object is to provide a cryogenic selector switch which allows full realization of the advantages of the systems principle disclosed herein.

The foregoing objects, features and advantages of the invention will be apparent from the following more particular description of a preferred embodiment of the invention as illustrated in the accompanying drawings.

Figure 2:
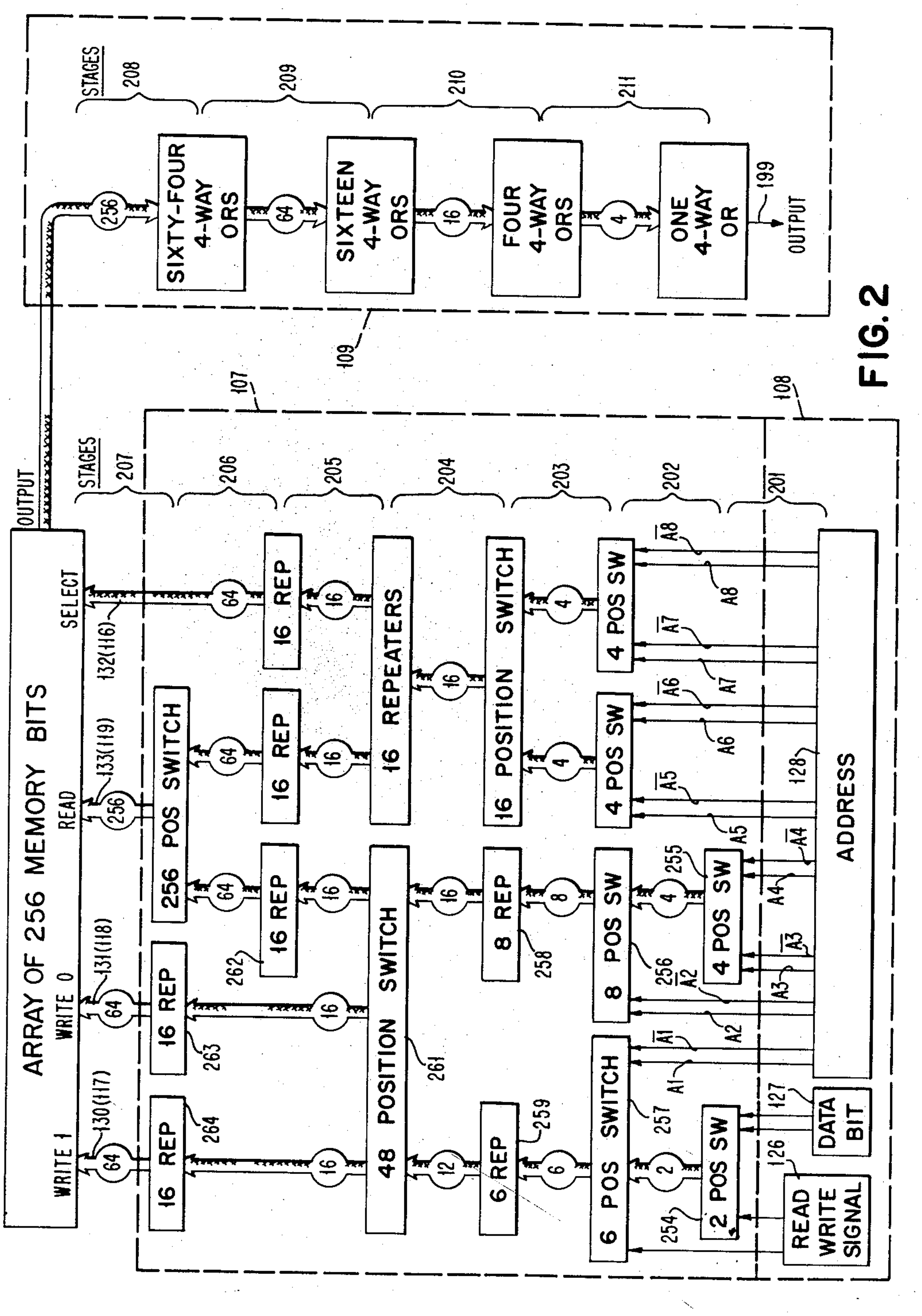
FIGURE 2 is a flow diagram showing the general organization of the memory addressing circuitry.
Figure 4:
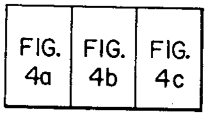
Figure 4A:
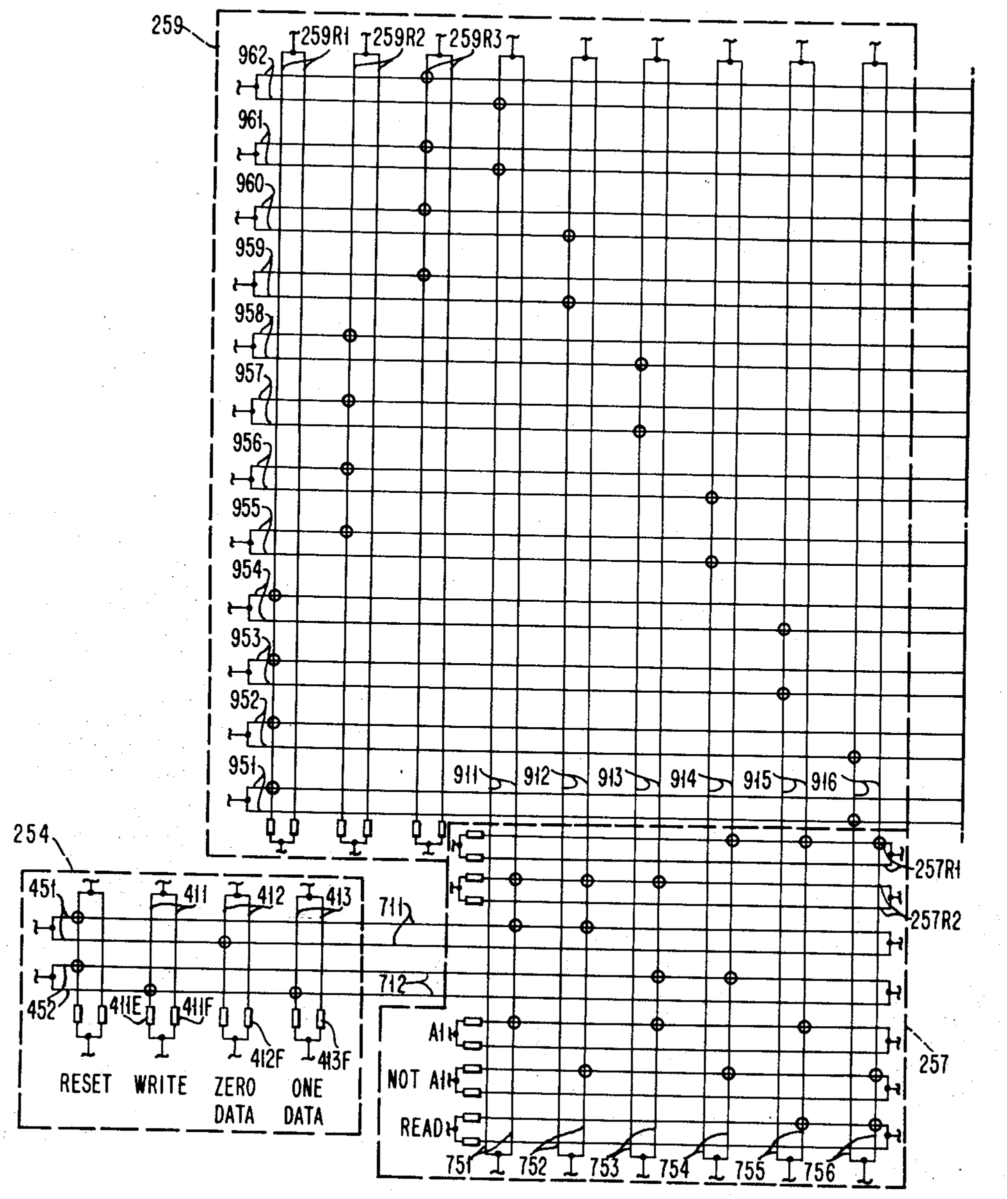
Figure 4B:
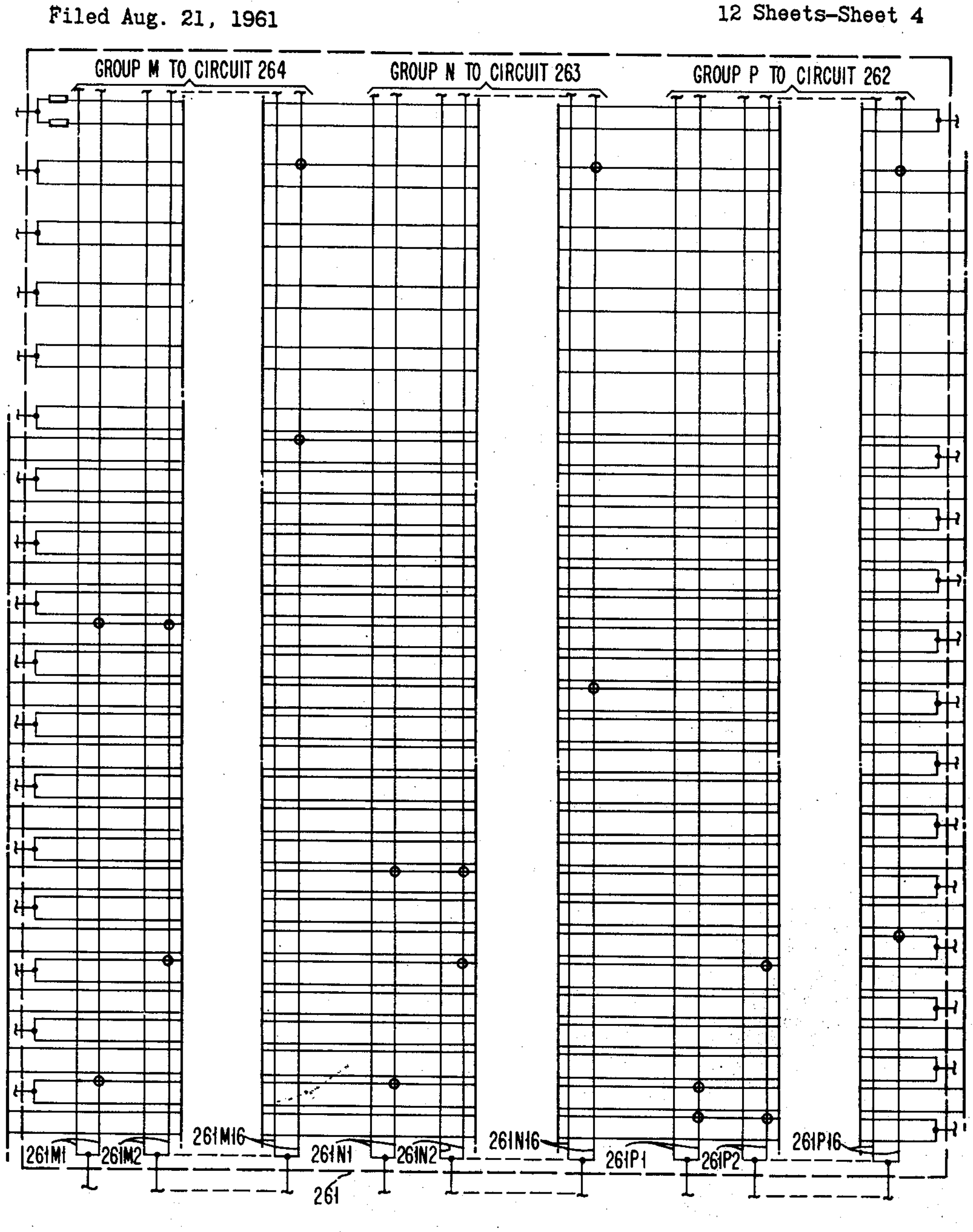
Figure 4C:
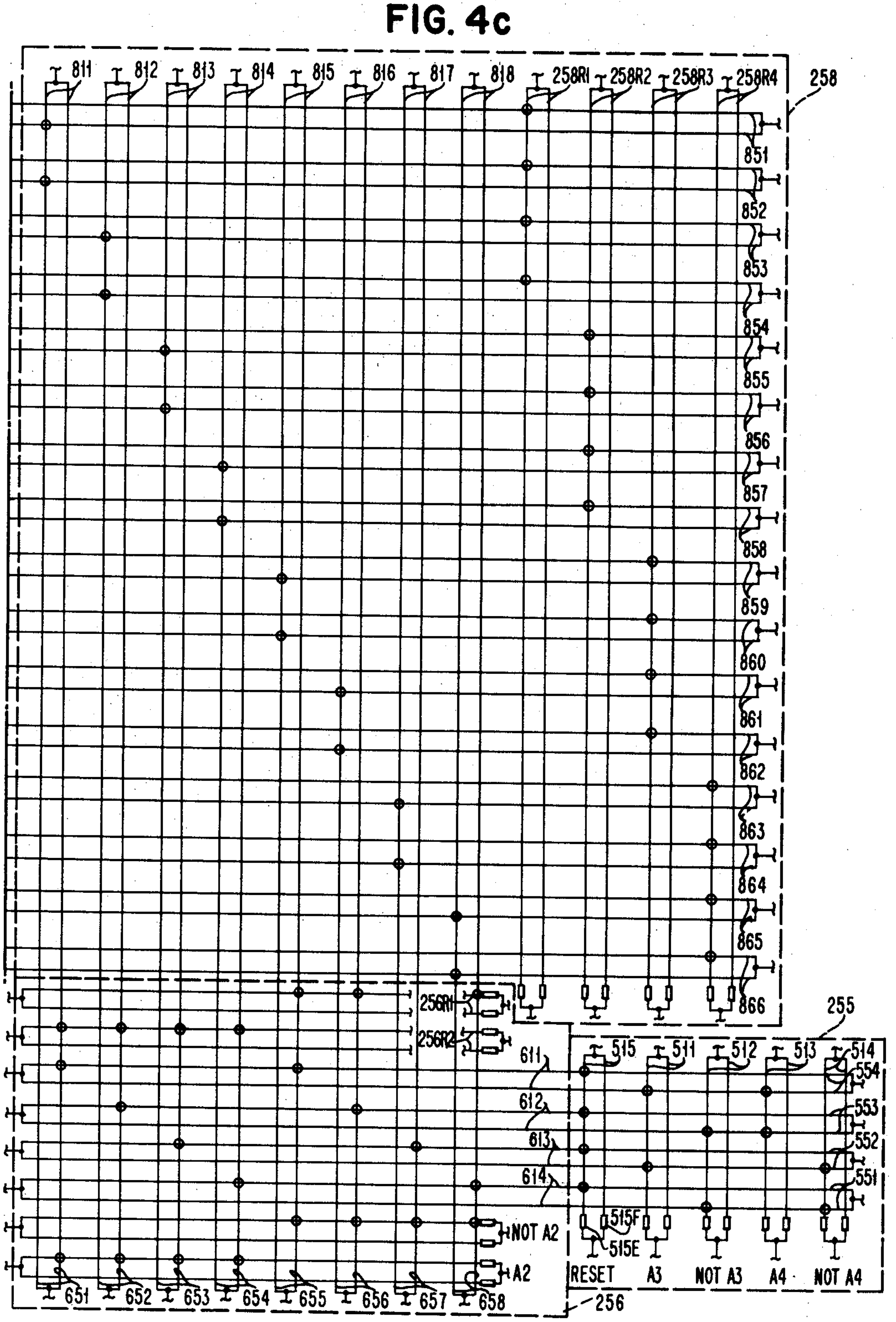

FIGURES 4*a*, 4*b* and 4*c* (which fit together as shown in FIGURE 4) are detailed circuit layout diagrams showing the detailed organization of a representative portion of the addressing circuitry shown in FIGURE 2.

Figure 1:
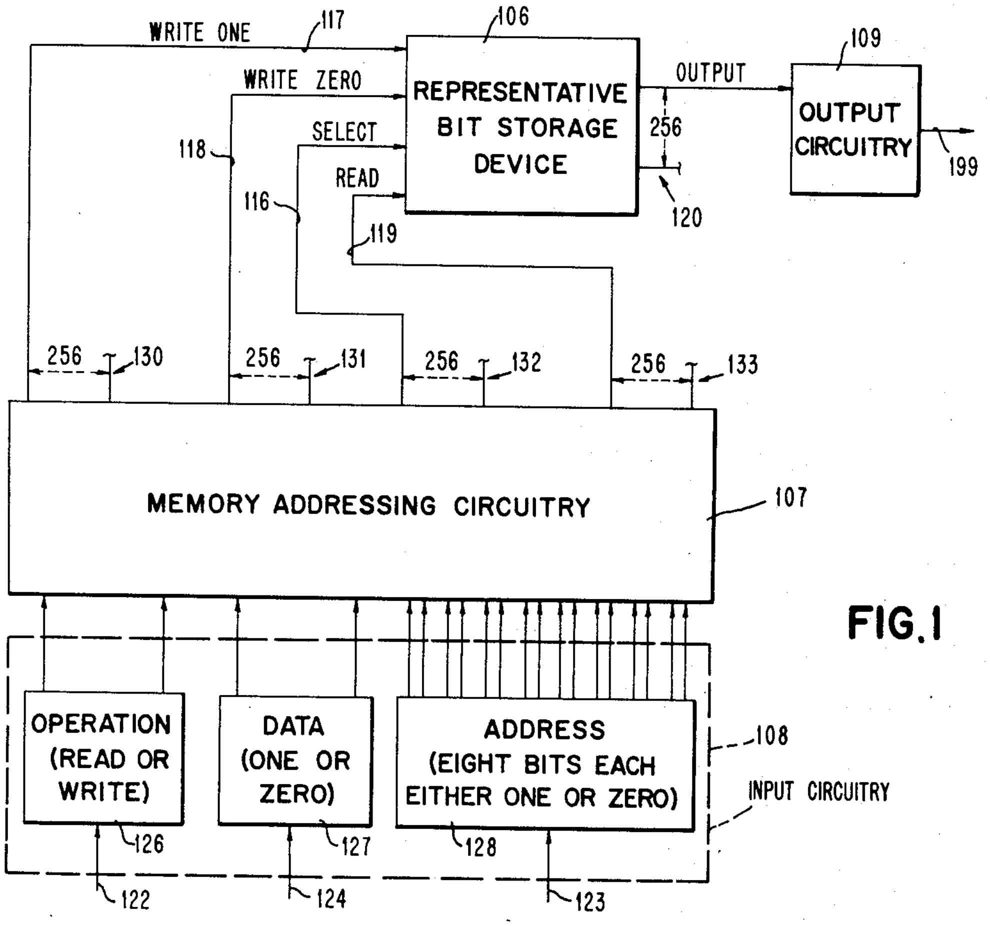
FIGURE 1 is a schematic block diagram showing the general organization of the memory system.
Figure 5:
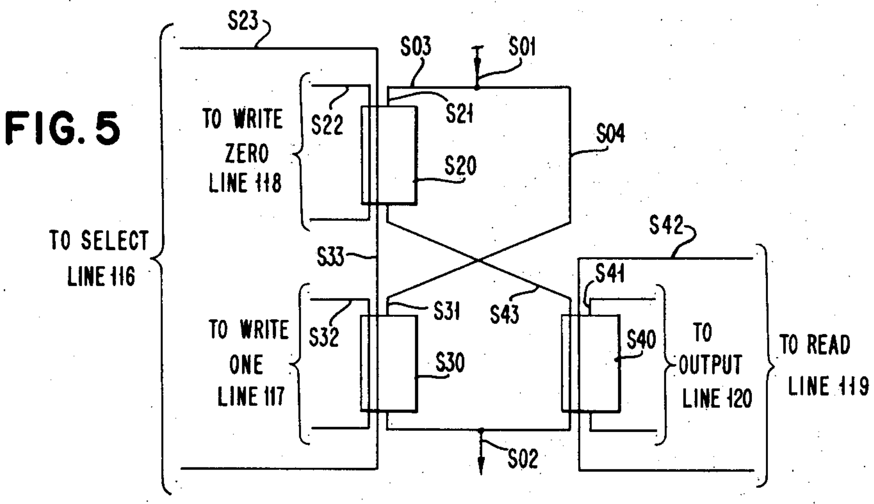

FIGURE 5 is a detailed circuit diagram of the representative bistable storage device shown in FIGURE 1.

Figure 6:
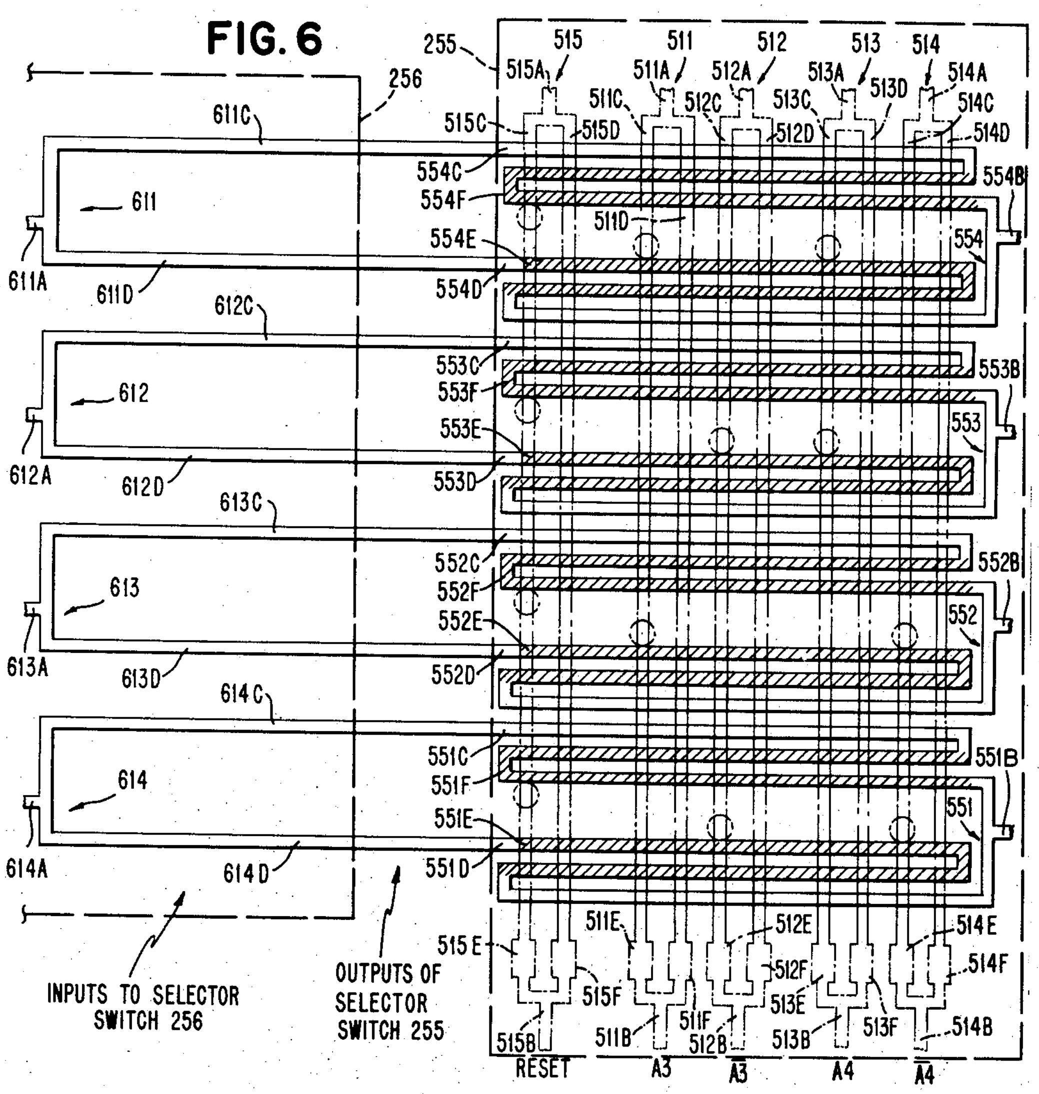

FIGURE 6 shows the structure of one of the selector switches shown in FIGURE 2.

Figure 7:
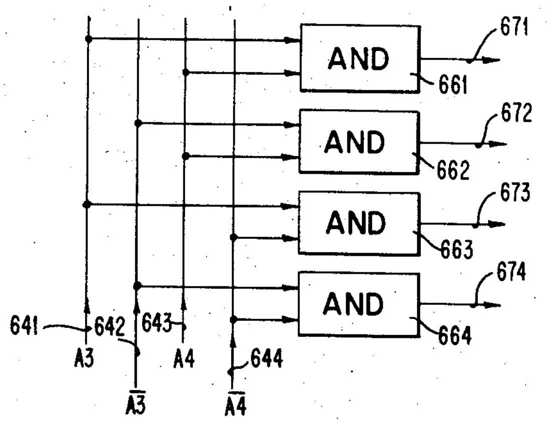

FIGURE 7 shows the logical equivalent circuit of the selector switch which is shown in detail in FIGURE 6.

Figure 8:
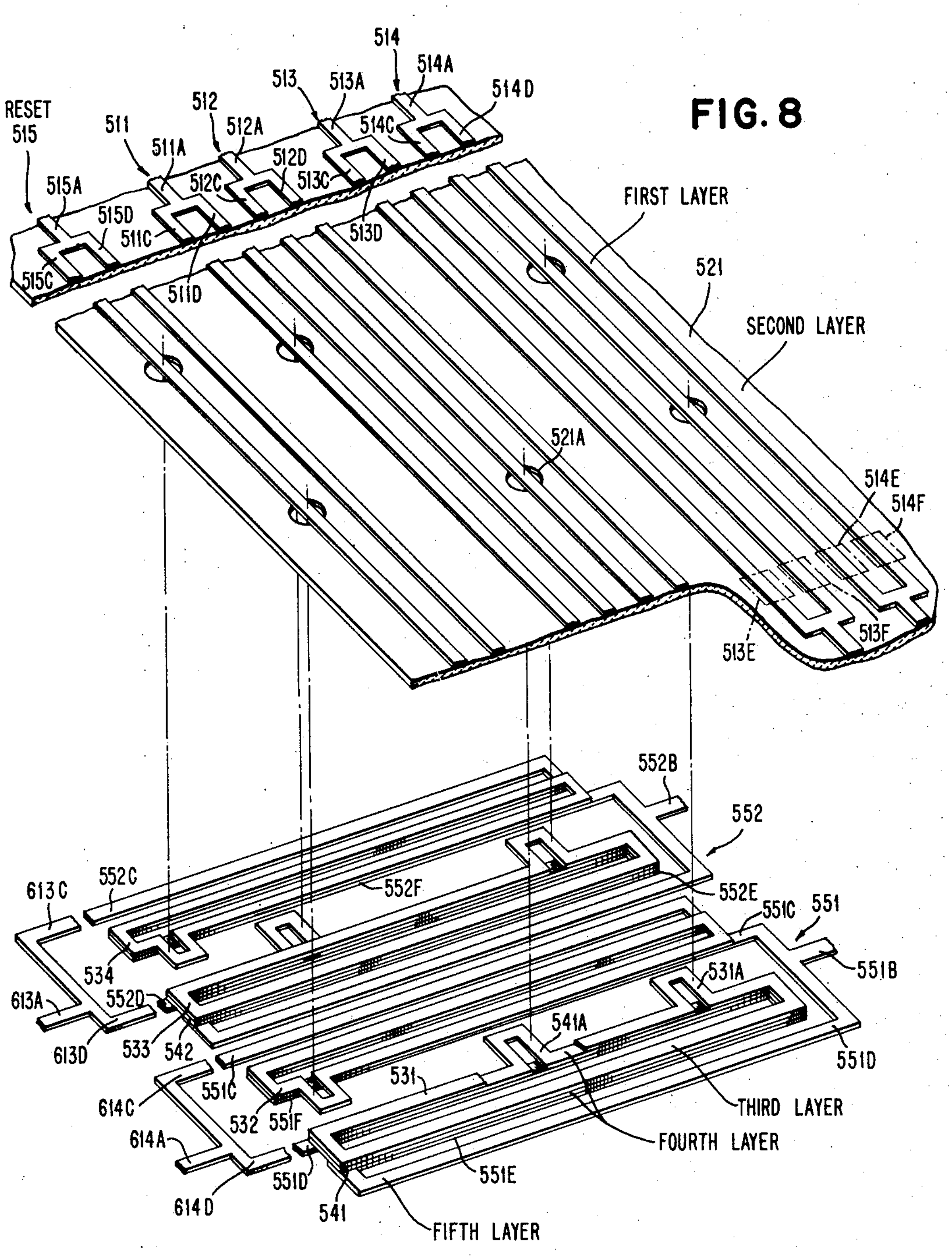

FIGURE 8 is an exploded perspective view of a part of the representative selector switch shown in FIGURE 6.

Figure 9:
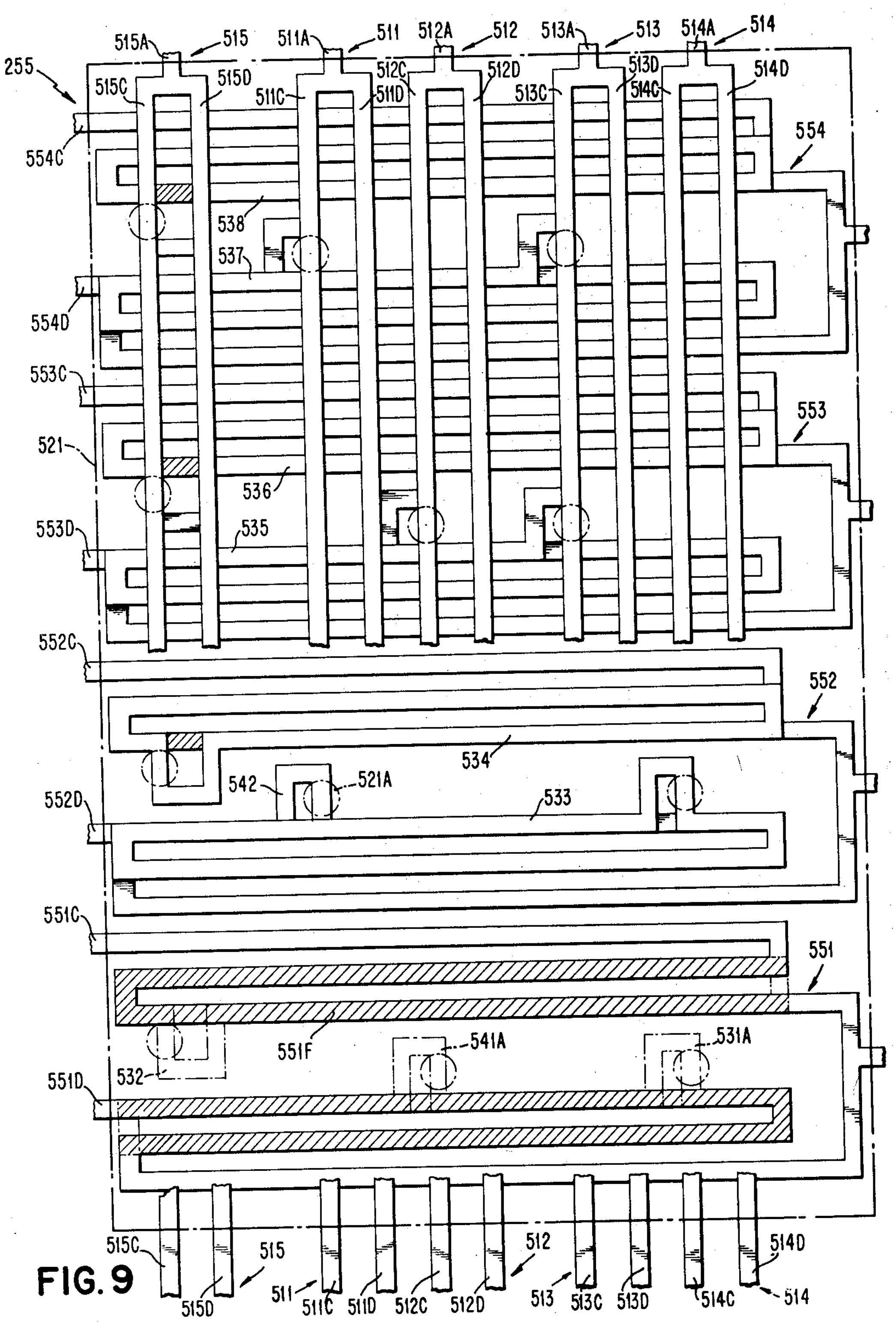

FIGURE 9 is a partially cut-away plan view of the selector switch of FIGURE 8.

Figure 10A:
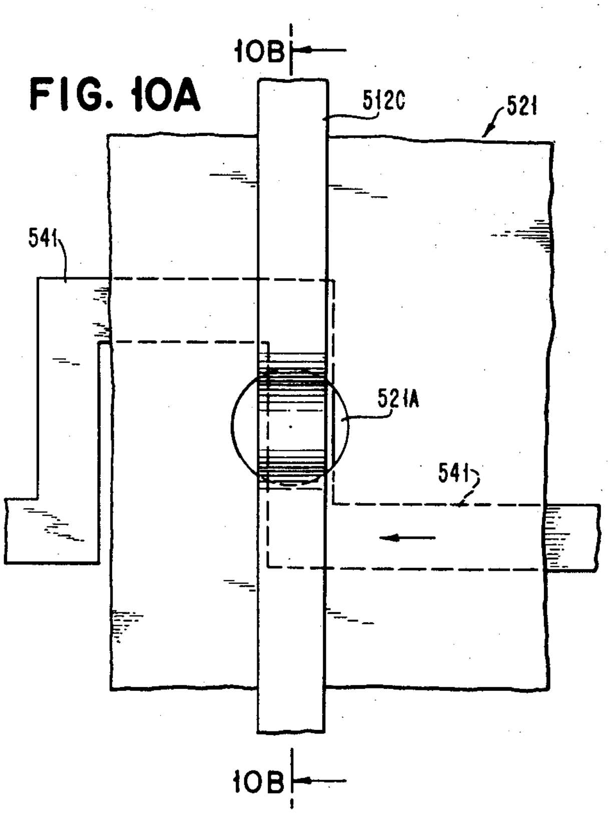
Figure 10B:
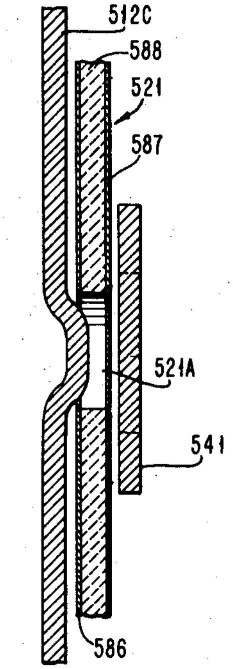

FIGURES 10*a* and 10*b* (which are located on the same sheet as FIGURE 5) are detailed views of the circuitry around a hole in the substrate of the selector switch shown in FIGURE 6.

Figure 11:
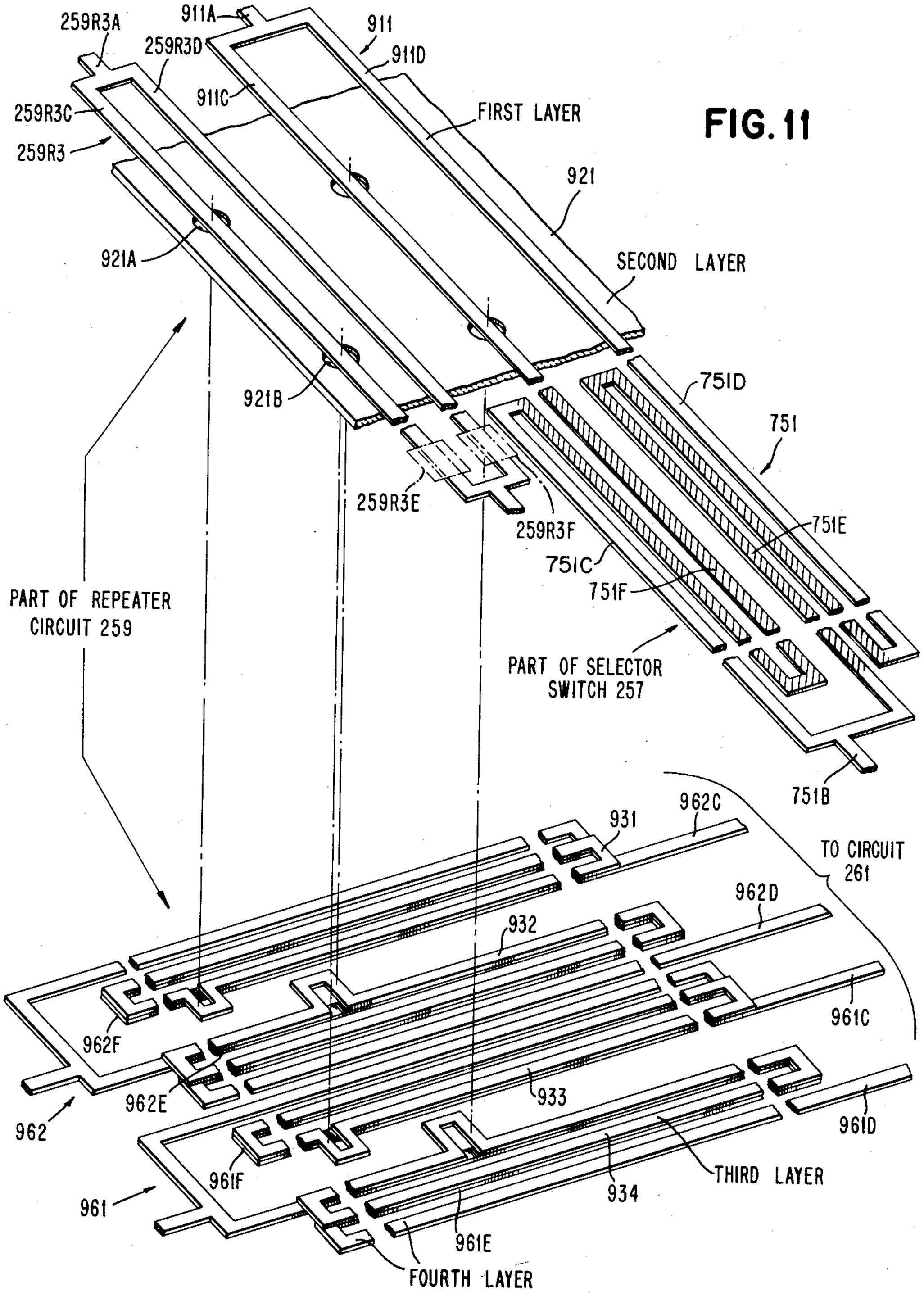

FIGURE 11 is an exploded perspective view of part of a repeater circuit for use in the addressing circuits.

Figure 12:
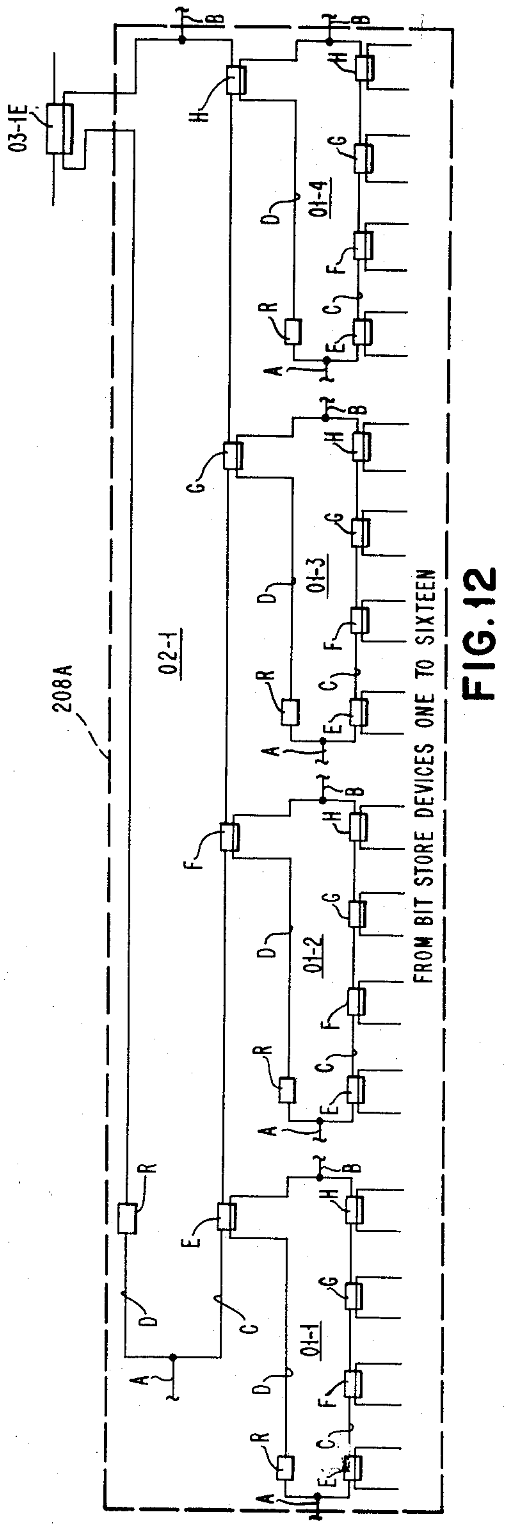

FIGURE 12 is a circuit diagram of the output circuitry for the momory system.

Figure 13:
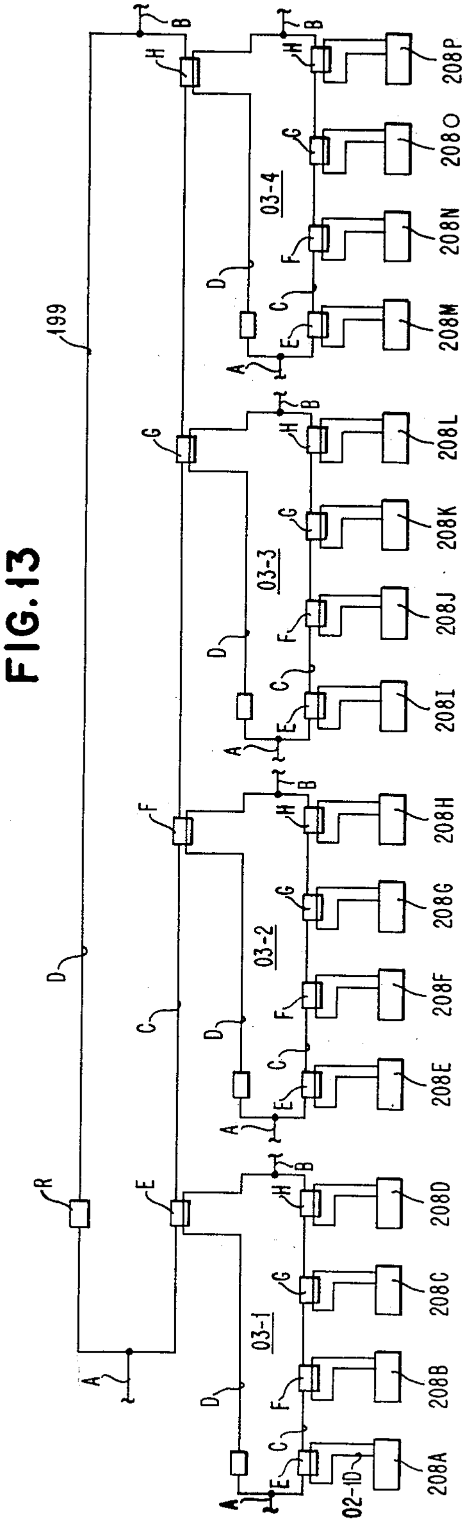

FIGURE 13 is a detailed circuit diagram of a representative portion of the circuitry shown in FIGURE 12.

Figure 14:
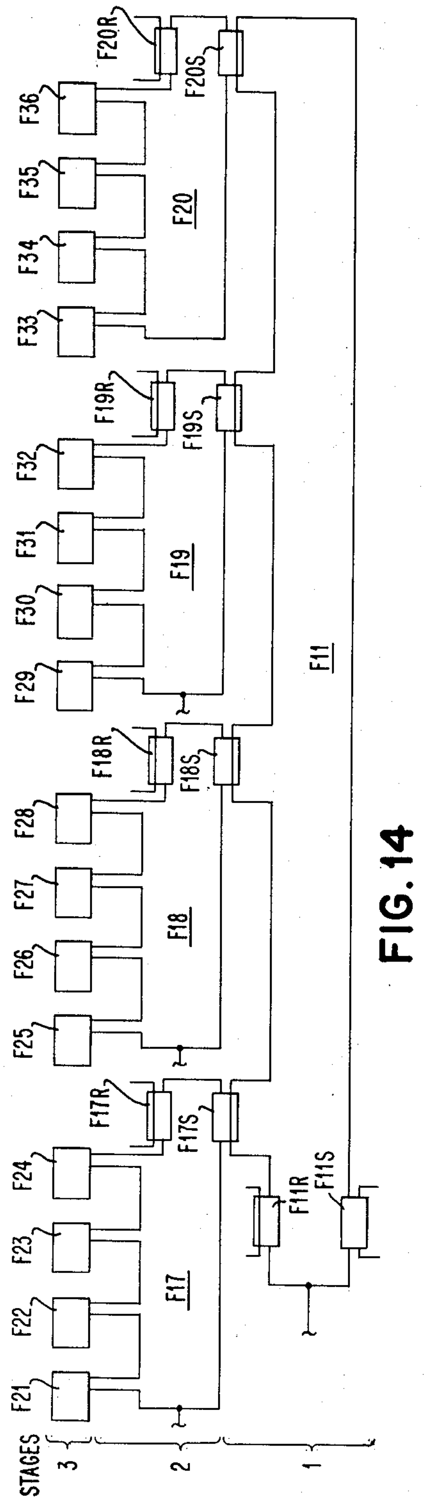

FIGURE 14 is a circuit diagram of a plurality of stages used to axplain fan out.

Figure 15:
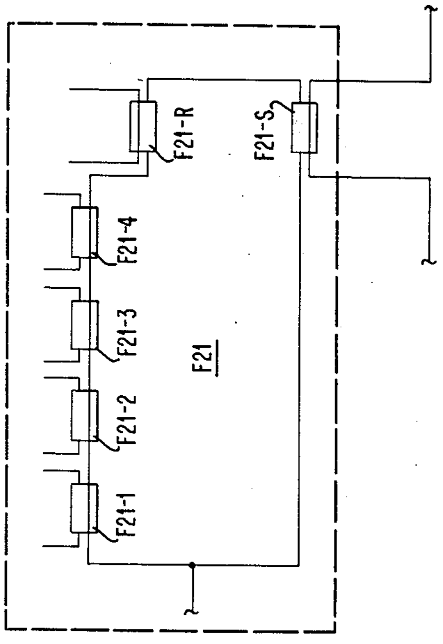

FIGURE 15 is a detailed diagram of one of the circuits shown in FIGURE 13.

The particular embodiment of the invention which is shown herein is a cryoelectric memory system which has the capacity to store two hundred and fifty-six bits of information. The general organization of the memory system is shown in FIGURE 1. There are four major components to the system, the bit storage devices 106 (the system has two hundred and fifty-six bit storage devices; however only one representative bit storage device 106 is shown in FIGURE 1), the selection circuitry 107, the input circuitry 108, and the output circuitry 109.

Each of the bit storage devices 106 has four inputs, a write-one input 117, a write-zero input 118, a select input 116, and a read input 119; and an output 120. In order to store a "one" in any particular bit storage device the select line 116 and the write-one line 117 associated with the particular storage device 106 must be coincidently activated; in order to store a "zero" in any bit storage device the select line 116 and the write-zero line 118 associated with the particular storage device 106 must be coincidentally activated; and in order to read information from any particular storage device the read line 119 associated with that particular storage device must be activated.

An external system for example, a computer (not shown), supplies the input circuitry 108 of the memory system of the present invention with three separate inputs. The first input 122 indicates whether a read or a write operation is desired (i.e., a read-write signal), the second input 123 designates which particular bit storage device is to be read into or read from (i.e., an address) and the third input 124 indicates whether a "zero" or a "one" is to be stored in the particular bit storage device whose address is specified by input 123 (i.e., a data bit). Circuits 126, 127 and 128 respectively receive the input signals applied to system inputs 122, 123 and 124 and provide signals for activating the memory addressing circuitry 107.

The memory addressing circuitry 107 has four sets of outputs designated as outputs 130, 131, 132 and 133. Each set of outputs includes two hundred and fifty-six output lines. One line from each set of lines 130 to 133 is connected to each of the two hundred and fifty-six bit storage devices; however, for ease of illustration only those lines which are connected to the representative storage device 106 are shown in FIGURE 1. Those lines which are shown are designated as lines 117, 118, 119 and 120.

Memory addressing circuitry 107 (which will be explained in detail later) accepts signals from input circuits 126, 128 and 128. If circuit 126 indicates that a write operation is to be performed circuit 107 activates one of the select outputs 132 and either one of the write-zero outputs 131 or one of the write-one outputs 130 depending upon the input received from circuit 127. If circuit 126 indicates that a read operation is to be performed memory address circuit 107 activates one of the read lines 133. Circuit 107 also activates a select line during the read operations but the select line is not effective since neither a write-one nor a write-zero line is active. The particular line in each set of lines 130 to 133 which is activated at any particular time is controlled by an address in the form of an eight digit input signal which circuit 107 receives from circuit 128.

FIGURE 2 is an information flow diagram of memory address circuit 107. Memory address circuit 107 consists of seven stages of circuitry respectively designated as stages 201 to 207. The system input circuits 126, 127 and 128 provide inputs to the first stage and to parts of the second stages of the circuitry.

The symbology used in FIGURE 2 has been chosen to show the organization of the memory addressing circuitry. The details are shown in other figures. Each line from input circuit 108 to the first and second stages 201 and 202 represents an input signal line. The cables which interconnect the switching devices have numerals therein, for instance, the cable which interconnects circuit 256 to circuit 258 has the numeral "8" therein. These numerals represent the number of information paths between the various circuits. As will be seen later, each information path consists of two lines which form parallel current paths between a current source and a current sink.

The eight address digits supplied to circuit 107 from circuit 128 are divided into two groups, the first group consisting of address digits A1 to A4 is combined with the data bits from circuit 127 and with the read-write signals from circuit 126 to selectively activate (when a write signal is present from circuit 126) the write-one lines 130 or the write-zero lines 131 of the various bit storage devices. Whenever a write signal is present from circuit 126, either sixteen write-one lines 130 or sixteen write-zero lines 131 are activated. Whether sixteen of the write-one lines 130 or sixteen of the write-zero 131 lines are activated depends upon the output from circuit 127.

The particular sixteen write-one lines 130 or the particular sixteen write-zero lines 131 activated at any particular time is determined by the particular output from the first four digital positions of circuit 128. Each possible different output from the first four digital positions of circuit 128 activates the write-one 117 or the write-zero 118 inputs to a different set of sixteen bit storage devices. Stated differently, each different combination of signals from the first four digital positions of input device 128 activates the write-one 117 or the write-zero 118 inputs to sixteen different bit storage devices. Each group of sixteen bit storage devices which have either their write-one 117 or their write-zero 118 inputs simultaneously activated by a particular combination of outputs from the first four digital positions of circuit 128 comprise a first set of bit storage devices.

The second four address bits A5 to A8 are combined to activate the select line in the various bit storage devices. Any particular output from digits A5 to A8 of circuit 128 activates the select line in sixteen bit storage devices 106. Each possible combination of output signals from digital positions A5 to A8 from input device 128 is effective to activate the select line 116 of an entirely different group of sixteen bit storage devices 106. Each group of sixteen bit storage devices which have their select line 116 activated by a particular combination of outputs from digital positions A5 to A8 from circuit 128 comprises a second set of bit storage devices. The circuitry is so arranged that each bit storage device in each first set of bit storage devices is in a different second set of bit storage devices.

Since, whenever a write signal is present from circuit 126, the outputs from circuits 126, 127 and the first four digital positions of circuit 128 activate either the write-one 117 or the write-zero 118 lines (depending upon the output from circuit 127) of each bit storage device 106 in a first set of bit storage devices and since one of the bit storage devices in the particular first set of bit storage devices which has either a write-one 117 or a write-zero 118 line activated is also in the second set of bit storage devices which has a select line activated, a "one" or "zero" is written into one of the bit storage devices, i.e., that bit storage device whose address is specified by circuit 128.

Stated differently, it can be seen that part of the address (i.e., digits A5 to A8 from circuit 128) is used to activate the select line 116 in a second set (sixteen) bit storage devices. The read-write signal from circuit 126, the data bit from circuit 127 and the first four digits of the address from circuit 128 are used to activate when a write signal is present, either the write-one 117 or the write-zero 118 lines in a first set (sixteen) bit storage devices. The circuitry is so arranged that only one of the bit storage devices in any particular first set of bit storage devices is in any particular second set of bit storage devices. Hence, the write signal, the eight digit address, and the data bit combine to write information into one particular bit storage device.

Part of the same circuitry that is used during the write operations is also used during the read operation, however, the combination of circuits which is used is different. It should be noted that the select line in a second set of bit storage devices is activated by each address output from digital positions A5 to A8 emitted by circuit 128, irrespective of whether a read operation or a write operation is to be performed. However, when a read operation is to be performed, the select line is ineffective since none of the write-one 130 or the write-zero 131 lines is activated. Instead when circuits 126 indicates that a read operation is to be performed circuit 107, in a manner as to be described in detail later, activates the particular read line 119 designated by the address output from circuits 128.

For reasons that will become apparent later when the details of the construction of the actual circuitry of addressing circuit 107 is explained, each stage 201 to 207 of addressing circuit 107 has a delay associated therewith. That is, when a signal is supplied to the input of any particular stage 201 to 207 of the addressing circuit 107, the respective stage of the addressing circuit does not produce an output signal until a certain amount of time later. Furthermore, each stage 201 to 207 of addressing circuit 207 has a reset. Before a signal is applied to any one of the stages 201 to 207, the particular stage must be reset. After a signal is applied to the input of any stage 201 to 207, the particular stage, after a slight time delay produces an output, and this output persists until the circuit is reset.

If each of the stages 201 to 207 were simultaneously reset, it would be necessary to apply a signal to the first stages of the addressing circuitry from input circuits 126, 127 and 128 and then to wait until that particular set of input signals had progressed entirely through the seven stages 201 to 207 of the addressing circuitry 107 before resetting the entire circuit. After a set of signals had progressed through the entire seven stages of the circuitry, the circuit could be reset and a second set of signals applied.

By providing suitably timed rest pulses (see FIGURE 3) to the various stages of the circuitry, the present invention makes it possible to have several sets of signals progressing or streaming through the addressing circuitry 107 simultaneously. Each stage of the addressing circuitry is reset after a particular input to that stage has progressed through the particular stage and activated the next stage in the circuitry. In the present invention the read-write signal, the data bit signal, and the address of the particular bit storage device which is to be read into or read from are combined in the addressing circuitry. Hence, synchronization problems are minimized. All of the signals (the data bit, the read-write signal, and the address) which affect a particular bit storage device are combined in the addressing circuitry and all of the signals progress through the addressing circuitry together. Hence, if the delay introduced by each stage of the addressing circuitry is uniform there will be no synchronization problems.

In order for the delay introduced by each stage of the addressing circuitry to be constant it is essential that the delay introduced by each switching device in each stage of the addressing circuitry be constant irrespective of which particular inputs to the device are activated. The problem is complicated by the fact that in each stage of the addressing circuitry there are several devices each of which have a different number of inputs and a different number of outputs. The novel switching devices of the present invention, which are explained in detail later, insure that the delay introduced by each switching device in the various stages of the addressing circuitry is identical.

With the novel switching device of the present invention, regardless of which particular inputs to any particular switching device are activated, the delay introduced by the particular switching device is constant. Stated differently, the delay between the application of input signals to a switching device and the production of output signals therefrom is not dependent upon which particular inputs to the switching device are activated to produce the particular outputs. As will be explained later in addition to the above characteristics the novel switching devices of the present invention also have a low inductance to resistance ratio and hence they switch very quickly.

Since certain of the output signals from system input devices 126, 127 and 128, as shown in FIGURE 2 go to the first stage 201 of the circuitry 107 and certain of the other inputs from circuits 126, 127 and 128 go to the second stage 202 of the addressing circuitry 107, it is obvious that the reset of the first stage and the application of a second set of input signals from circuits 126, 127 and 128 cannot take place until the signals applied to the first stage 201 of the addressing circuitry have progressed through that particular stage to the second stage of the circuitry 202. By examining the timing diagram shown in FIGURE 3 it can be seen that this is done.

Before a more detailed explanation of the entire switching circuitry 107 is given, a detail explanation of a representative selector switch will be given with reference to FIGURES 6, 7, 8, 9, 10*a* and 10*b*, and a detailed explanation of a repeater circuit will be given with reference to FIGURE 11.

*Details of a Representative Selector Switch*

The detailed structure of one representative selector switch, i.e., selector switch 255 is shown in FIGURES 6, 8, 9, 10*a* and 10*b*. Each of the other selector switches are constructed similarly to the selector switch 255. The difference between selector switch 255 which is shown in detail and the other switching devices in circuit 107 will be pointed out later with reference to FIGURES 2 and 4.

It should be noted that in general there is a logical pattern to the assignment of the numerals which designate the various parts of the selector switch. As will be seen later the selector switch has a plurality of layers of components and the numeral in the tens digital position of the reference number assigned to any part of the selector switch, designates the particular layer in which the particular part may be found. For example, part 531 is located in the third layer of circuitry. Certain related parts are designated by a three digit numeral followed by a capital letter. The three digit numeral which precedes the capital letter designates an assembly to which the parts are related. Parts, the designation of which are followed by the same capital letter, are in general related. For example, current source wire 551A and current sink wire 551B are respectively the current source wire and the current sink wire for loop 551, and parts 551A and 552A are both current source wires.

The logical functions which selector switch 255 generates are shown in FIGURE 7. Essentially circuit 255 is equivalent to four AND circuits, i.e., AND circuits 661 to 664. The circuit shown in FIGURE 7 receives four inputs on lines 641, 642, 643 and 644, and produces four output functions on line 671 to 674. The input lines 641 to 644 are respectively associated with the input functions A3, NOT A3, A4 and NOT A4. Activation of any possible combination of two input lines activates one of the output lines 671 to 674. Note that simultaneous activation of certain combinations of input lines is not possible, for instance, line A3 and line NOT A3 can not be simultaneously active. As will be seen later selector switch 255 generates the same functions as does the circuit shown in FIGURE 7.

In the selector switches of the present invention, each input variable and each output function has associated therewith a superconductor loop circuit which has a current source wire, a current sink wire and two current paths connecting the current source wire to the current sink wire. A current is constantly applied to the loop circuit through the current source wire by a constant current source (not shown) and this current flows through one or the other of the current paths to the current sink wire. Current in one of the current paths indicates that the variable or function associated with the particular loop circuit is a "one" and current in the other current path indicates that the function or variable is a "zero". For example, the input variable A3 is associated with superconductor loop circuit 511 which has a current source wire 511A, a current sink wire 511B and two current paths 511C and 511D connecting the current source wire to the current sink wire. Current in path 511C indicates that the input variable A3 is a "one" and current in current path 511D indicates that the variable A3 is a "zero." Such loop circuits are well known in the cryoelectric art and no further explanation of how current is supplied to the various loop circuits through their respective current source wires or how current is taken from the various loop circuits by way of their current sink wires is given. Furthermore for the sake of brevity the various current source wires and the various current sink wires are alternately referred to as current sources and current sinks.

Each loop circuit has a cryotron gating element connected in series with each of its current paths. For ease of illustration, cryotron gating elements 511E to 515E and 511F to 515F in the input loop circuits 511 to 515 are only shown symbolically with phantom lines in FIGURES 6 and 8 and they are not shown in FIGURE 9. The actual physical structure of cryotron gating elements 551E to 554E and 551F to 554F is shown in FIGURES 6, 8, and 9 by cross hatching. Each of the cryotron gating elements 511E to 515E, 511F to 515F, 551E to 554E and 551F to 554F may be made resistive by application of a magnetic field. Such elements are well known in the art and no further explanation of the physical structure or metallic composition thereof will be given herein.

Circuit 255 has four superconductive input loop circuits 511 to 514 (shown in phantom in FIGURE 6) one for each of the input variables A3, NOT A3, A4 and NOT A4. Current is directed into one particular path of each of the input loop circuits 511 to 514 by circuit 128 (FIGURE 1) through cryotron gating elements 511E to 514E and 511F to 514F. Control lines from circuit 128 (not shown in FIGURES 6, 8 or 9) generate magnetic fields to selectively make the cryotron gating elements resistive. Circuit 255 also has four output loops 551 to 554, one for each output function. The output functions with which the loops 551 to 554 are associated are the same functions with which output 671 to 674 shown in FIGURE 7 are associated. The input loops 511 to 515 are separated from the output loops 551 to 554 by substrate 521 (shown in FIGURES 8 and 9, but not in FIGURE 6). However, the output loops 551 to 554 are coupled to the input loops 511 to 514 through holes in the substrate 521 in a manner which will be explained in detail later.

It should be noted that the current sink wires for the output loops 551 to 554 are respectively numbered 611A to 614A and that the right hand portion of the current paths for loops 551 to 554 are respectively numbered 551C to 554C and 551D to 554D whereas the left hand portion of the current paths for loops 551 to 554 are numbered 611C to 614C and 611D to 614D. The reason for this is that the output loops for selector switch 255 form the input loops for selector switch 256. Current paths 611C to 614C and 611D to 614D are actually extensions of paths 551C to 554C and 551D to 554D but they are given different numbers since they are part of selector switch 256 rather than selector switch 255. The manner in which the outputs of selector switch 255 form the inputs of selector switch 256 will be seen in detail later when the interconnections between the various switching device is described with reference to FIGURES 4*a*, 4*b* and 4*c*. For the present discussion the lines 611C to 614C, 611D to 614D and 611A to 614A may be considered part of selector switch 255.

As can be seen in FIGURE 8, the selector switch 255 consists of five layers of circuitry. The first layer of circuitry consists of the input loops 511 to 514 and the reset loop 515. The second layer of circuitry consists of substrate 521 on which the various other layers of circuitry are deposited. The third layer of the circuitry consists of the closed loop circuits 531 to 538 (only loops 531 to 534 are shown in FIGURE 8). The next layer of circuitry consists of closed loop circuits 541 to 544 (only loops 541 and 542 are shown in FIGURE 8). The loop circuits 531 to 538 and 541 to 544 are merely closed loops of superconducting metal. They are hereinafter referred to as transformer loops for reasons which will become apparent later. The final layer of circuitry consists of output loops 551 to 554 (only loops 551 and 552 are shown in FIGURE 8).

As previously described each of the input superconducting loop circuits 511 to 514 include a current source wire respectively designated 511A to 514A, a current sink wire respectively designated 511B to 514B, two superconducting paths 511C to 514C and 511D to 514D connected between the respective current source wires 511A to 514A and the respective current sink wires 511B to 514B and cryotron gating element 511E to 514E and 511F to 514F respectively connected in series with current paths 511C to 514C (only the cryotron gating elements in loops 513 and 514 are shown in FIGURE 8). Each of the cryotron gating elements 511E to 514E and 511F to 514F has associated therewith a control line (not shown in FIGURE 8) which is activated by circuit 128 (FIGURE 1).

Current in any control line is affected to make the associated cryotron gating element resistive.

The bottom layer of circuitry consists of output superconducting loops 551 to 554. Each of the output loops 551 to 554 has a current source wire respectively designated 611A to 614A, a current sink wire respectively designated 551B to 554B and two current paths connecting each current source to the respective current sink. These paths include the current paths 551C to 554C, 551D to 554D, 611C to 614C and 611D to 614D. Each current path 551C and 554C and 551D to 554D includes the gating element of an inline cryotron respectively designated 551E to 554E and 551F to 554F. (See FIGURE 6.)

The folded shape of the cryotron gating elements 551E to 554E and 551F to 554F should be particularly noted. By fabricating the gating elements in this shape the direction of the circulating current in the various transformer loops is in opposition to the current in the cryotron gating element for the entire length of the transformer loops. In this way the entire length of each transformer loop can be used as the control for an in-line cryotron.

With reference to FIGURES 8 and 9 it can be seen that on top of each of the cryotron gating elements 551E to 554E there are two transformer loops. One of the loops on top of each cryotron gating element is from the group of loops 531 to 538 and the second loop on top of each gating element is from the group of transformer loops 541 to 544. The nature of the in-line cryotron gating elements 551E to 554E is such that when there is current circulating in both of the transformer loops above a particular cryotron gating element the cryotron gating element is resistive. For example, when there is a current circulating in transformer control loops 531 to 541 the in-line cryotron gating element 551E is resistive. If there is current in only one of the control loops which is positioned over an in-line cryotron gating element 551E to 554E, the particular in-line cryotron gating element will remain superconductive. For example, if there is current in only one of the control loops 531 to 541 the in-line cryotron gating element 551E is superconductive. Only one transformer loop is positioned over each of the cryotron gating elements 551F to 554F in contrast to the cryotron gating elements 551E to 554E which have two transformer loops positioned over each gating element. The in-line cryotron gating element 551F to 554F are constructed so that when there is current circulating in the transformer loop positioned over any particular cryotron gating element the particular cryotron gating element is resistive. For example, when there is current circulating in transformer control loop 532, the in-line cryotron gating element 551F is resistive.

The two different types of cryotron gating elements required could be constructed by making the cryotron gating elements of two different types of material or by making all of the cryotron gating elements identical and biasing the gating elements which have only one superconducting control loop with a direct current bias. The details of fabricating such cryotron gates is known in the art, for example in the copending application referred above, and for that reason it is not described in detail herein.

Each transformer control loop is coupled to one current path 511C to 514C or to current path 515C of reset loop 511 by transformer action through a hole in the substrate 521. The coupling is such that if there is current flowing in the particular current path to which the particular transformer loop is coupled, current is induced in the particular transformer loop. For example, transformer loops 531 and 533 are coupled to current path 514C, hence, if there is current flowing in current path 514C, there also is current flowing in transformer loops 531 and 533. Although FIGURE 6 does not include substrate 521 the location of the holes in substrate 521 is shown in phantom lines to indicate how the input loops 511 to 515 are related to the output loops 551 to 554. The mechanism by which the coupling occurs will be explained in detail later.

By examining FIGURE 8 the reason for the shape of transformer 531 to 538 and 541 to 544 can be seen. The sections of the transformer loops which fit underneath the various holes in substrate 521, for example, section 531A, extend out from the main body of the various transformer loops. In this manner the input loop and the transformer loop run in a parallel direction at the place where the coupling occurs. In this manner the top loop is inductively coupled to the bottom loop and current in the top loop causes current to flow in the bottom loop. It should also be noted that the transformer loops which are placed on top of each other such as transformer loops 531 and 541 are not controlled by the same current paths. For example, transformer loop 531 is controlled by current path 514C whereas transformer loop 541 is controlled by current path 512C. By having a portion of each control loop extend away from the main body of the loop it is possible to independently control two transformer loops which are positioned on top of each other.

FIGURE 9 is a cut away view showing the various layers of circuitry. FIGURE 9 is in three different sections, the bottom section of FIGURE 9 shows output control loop 551 in solid lines with other layers of circuitry which are positioned over output loop 551 shown in phantom lines. The middle section of FIGURE 9 is the section which includes output loop 552. In this section of the figure only the input loops 511 to 515 and the substrate are cut away. The control loops 533, 534 and 542 are shown where visible in solid lines. The upper section of FIGURE 9 is that section which includes output loops 553 and 554. In this section of FIGURE 9 nothing is cut away except the substrate 521.

The details of how the coupling between the various input lines and the transformer loops is accomplished is shown in FIGURES 10*a* and 10*b* which show the details of the structure around the hole 521A in substrate 520. The hole 521A is the hole through which the current path 512C is coupled to transformer loop 541. FIGURE 10*a* is a plan view showing the conductor 512C, the substrate 521, the hole 521A and the transformer loop 541 in dotted lines. Conductor 541 is shown as offset from conductor 512C merely for the purpose of clarity of illustration. It is actually located directly beneath conductor 512C. FIGURE 10*b* is a side view which brings out a particular feature which increases the coupling action. That is, the input conductors are not merely straight conductors, instead they have a slight dip into the hole in the substrate. This dip in the input conductors increases the coupling action between the input conductors and the transformer loops. For ease of illustration, the dips in the various input conductors over the various holes in the substrates are not shown in the other figures. However, it should be understood that wherever there is an input conductor coupled to a conductor on a different side of the substrate through a hole in the substrate, the input conductor has a slight dip down into the hole in order to increase the coupling action.

FIGURE 10*b* also shows the details of the structure of substrate 521. The substrate 521 consists of two superconducting ground planes 586 and 587 and a supporting material 588. As is known in the art the superconducting ground planes 586 and 587 are respectively used as return paths for the current in the circuitry (except the transformer loops) which is located next to the ground planes. Since such structure is known in the art it is not described in detail herein. In the interest of clarity of illustration the superconducting ground planes 586 and 587 are not shown in the other figures.

The structure and operation of the selector switch 255 will now be explained in detail (see FIGURE 6). Current path 511C is coupled to control loops which are positioned over cryotron gating elements 552E and 554E, current path 512C is coupled to transformer control loops positioned over cryotron gating elements 551E and 553E, current path 513C is coupled to transformer loops positioned over cryotron gating elements 553E and 554E; and current path 514C is coupled to transformer loops positioned over cryotron gating elements 551E and 552E. Current path 515C of reset loop 515 is coupled to transformer control loops positioned over cryotron gating elements 551F, 552F, 553F and 554F.

The output loops 551 and 554 are initially reset, i.e., current is switched into current paths 551D to 554D by current in current path 515C of reset loop 515 which activates cryotron gating elements 551F to 554F thereby introducing resistance into current paths 551C to 554C and switching the current in current loops 551 to 554 into current paths 551D to 554D. Once the output loops 551 to 554 have been reset, they can be selectively switched by the input loops 511 to 514.

The input loops 511 to 514 are initially reset by the activation of cryotron gating elements 515E to 514E thereby causing the current in the input control loops 511 to 514 to flow in current paths 511D to 514D. Once the input loops have been reset they can be selectively activated by control lines (not shown) which activate cryotron gating elements 511F to 514F which selectively introduce resistance into current paths 511D to 514D thereby selectively switching current in the input loops 511 to 514 into selected current paths 511C to 514C.

Current in current path 512C is coupled to transformer control loops 541 and current in current path 514C is coupled to transformer control loop 531. Both transformer control loops 531 and 541 are positioned over cryotron gating element 551E and hence if there is current in both current path 512C and current path 514C the cryotron gating 551E is made resistive and current is forced to flow in current path 551C. Likewise current in current paths 511C and 514C cause current to flow in the transformer control loops which control the cryotron gating element 552E thereby introducing resistance into current path 552D and causing current to flow in current path 552C. Current paths 512C and 513C are coupled to transformer loops positioned over cryotron gating element 553E and hence, current in current paths 512C and 513C is forced to flow in current path 553C. Likewise, when there is current flowing in input paths 511C and 513C the cryotron gating elements 554E is made resistive and current is forced to flow in current path 554C.

The operation of selector switch 255 may be summarized as follows: initially the input current loops 511 to 515 are reset by activating cryrotron gating element 511E to 515E thereby causing current to flow in current paths 511D to 515D. The output loops 551 to 554 are reset by the reset loop 515 by activating cryotron gating element 515F thereby switching the current in reset loop 515 from current path 515D to current path 515C. The current in current path 515C is coupled to transformer control loops positioned over cryotron gating elements 551F to 554F which introduce resistance into current paths 551C to 554C thereby causing the current in current loops 551 to 554 to flow in current paths 551D to 554D. Once the input and the output circuits have been reset, input signals are selectively supplied to the input currents loops 511 to 514 by the selective activation of cryotron gating elements 511F to 514F which selectively switch current into current paths 511C to 514C. The current in current path 511C to 514C controls the cryotron gating elements 551E to 554E to selectively switch the current in the output current loops 551 to 554 into selected current paths 551C to 554C. The current paths 551C to 554C are connected to current paths 611C to 614C which are used as the input lines to the next stage of the circuitry.

It should be noted that the various diagrams do not show any insulation between the circuitry. This omission in the drawings was made for the purpose of simplification and to facilitate an understanding of the operation of the device.

Several of the features of the selector switch should be particularly noted. The time required for a cryoelectric circuit to switch from the conducting to the non-conducting state is dependent upon the ratio of the resistance to the inductance of the circuit. The resistance of any circuit is dependent upon the length of the circuit and the inductance of the circuit is dependent upon the configuration of the circuit. With reference to the selector switch shown herein, it should be noted that each of the input and the output circuits from the selector switch are identical in length and configuration. Hence, the time required to switch any circuit in the selector switch is identical irrespective of which inputs are activated. This is particularly advantageous in the present system and makes the synchronization problem much simpler. It should further be noted that the pattern of the circuitry on each side of the substrate is relatively simple, mostly consisting of straight lines. This simple pattern of circuitry makes the construction of the circuitry by such batch process as vapor deposition much simpler.

*Details of a Representative Repeater Circuit (FIGURE 11)*

The need for repeater circuitry arises because a fan out limitation is imposed on the circuitry in order to maximize speed. The reason that the fan out limitation which is imposed on the circuitry maximizes speed will be explained in detail later; however, for present purposes it is sufficient to understand that due to the fan out limitation of the circuitry each output from a selector switch can control four cryotron gates. Where it is desired to have one output control more than four cryotron gates a repeater circuit is needed. As will be seen later with reference to FIGURES 4*a* and 4*b* repeater circuit 259 is needed between selector switch 257 and selector switch 261 since each output from selector switch 257 must control eight cryotrons in selector switch 261. By inserting repeater circuit 259 each output from selector switch 257 is made into two outputs from repeater 259 and each output from repeater 259 only need control four cryotron gates.

FIGURE 11 shows in partially exploded perspective fashion a representative portion of repeater circuit 259. The portion of repeater circuit 259 shown in FIGURE 11 consists of input current paths 911C and 911D, subtrate 921 and output loops 961 and 962. The output loops 961 and 962 respectively have current paths 961C and 961D and 962C and 962D. The current paths 961C, 961D, 962C and 962D have cryotron gating elements 961F, 961E, 962F and 962E respectively connected in series therewith. A representative output loop (i.e., output loop 751) from selector switch 257 which consists of current paths 751C and 751D, and cryotron gating elements 751E and 751F is also shown in FIGURE 11. Current paths 751C and 751D of selector switch 257 are connected in series with current paths 911C and 911D of repeater circuits 259. The cryotron gates 751E and 751F which are controlled by selector switch 257 direct the current from current source 751B into either current path 751C or current path 751D and likewise into current path 911C or current path 911D which are respectively connected in series with the current paths 751C and 751D. FIGURE 11 further shows a portion of the reset control loop 259R3 for repeater circuit 259.

The portion of repeater circuit 259 shown in FIGURE 11 is illustrative of the construction of the remaining portion of repeater circuit 259 and of all of the other repeater circuits. The repeater circuit has four layers of components. The first layer comprises the input lines 911C and 911D reset by 259R3, the next layer consists of the substrate designated 921, the third layer consists of transformer control loops 931 to 934. Two transformer control loops are associated with each output loop, one for each current path of the loop, for example transformer loop 931 and 932 are respectively associated with current paths 962C and 962D. The fourth layer comprises the output loops 961 to 962.

Each pair of input lines in a repeater circuit controls two output loops. For example, in the portion of the repeater circuit shown in FIGURE 11 input loop 911 controls both of the output loops 961 and 962. Although not shown in FIGURE 11 each output loop from selector switch 257 forms an input to repeater 259 and controls two output loops in repeater 259 similarly to the manner in which input loop 911 controls both output loops 961 and 962.

The mechanism through which input loop 911 controls output loops 961 and 962 is similar to the manner in which the output loops were controlled by the input loops in the selector switch 257 previously described. The left-hand current path in each input loop is coupled by induction to two transformer control loops each of which controls one output loop. Each of the current paths in each of the output loops has an in-line cryotron gating element connected in series therewith and the transformer control loops which are inductively coupled to the input loops act as control lines for the cryotron gating elements in the current paths of the output loops.

Output loop 961 and 962 have cryotron gating elements 961E, 961F, 962E and 962F respectively connected in series with their current paths 961D, 961C, 962D and 962C. Control loops 931 to 934 act as control lines for the cryotron gating elements juxtaposed therewith. Each cryotron gating element has one transformer control loop associated therewith and current in any particular control loop causes the associated cryotron gating element to become resistive, thereby shifting the current in the associated output control loop from one current path to the other current path. Each repeater circuit also has one or more reset loops. The reset loop 259R3 for repeater circuit 259 is shown in FIGURE 11. The reset loop has two control paths respectively designated 259R3C and 259R3D. Each of the current paths 259R3C and 259R3D has a control cryotron respectively designated 259R3E and 254R3F connected in series therewith. Current path 259R3C is inductively coupled to control loop 931 and 933 which respectively control cryotron gating elements 961F and 962F.

Initially cryotron 259R3E is activated by a control line (not shown) thereby introducing resistance into current path 259R3C and switching the current in the reset loop 259R3 into current path 259R3D. When it is desired to reset the output loops 961, 962 (and two other output loops not shown in FIGURE 11) the cryotron gating element 259R3F is activated by a control line (not shown) thereby introducing resistance into the current path 259R3D and switching the current in reset control loop 259R3D to 259R3C. The current in path 259R3C is inductively coupled to the control loop 931 and 933 through holes 921A and 921B in the substrate 921, hence, current is inducted in control loops 931 and 933 by the current in path 259R3C. Control loops 931 and 933 are the control lines for the cryotron gating elements 961F and 962F. Hence, when a current is introduced in control loop 931 and 933, the cryotron gating elements 961F and 962F are made resistive thereby switching current from paths 961C to 961D and from path 962C to path 962D.

Input signals are supplied to repeater circuit 259 by selector switch 257 which activates cryotron gating elements 751E and 751F thereby controlling the current into paths 911C and 911D. The current in path 911C is inductively coupled to control loops 932 and 934 which respectively cause cryotron 961E and 962E to become resistive thereby switching current into paths 961C and 962C which is the desired output. The coupling between the input lines and the control loops is accomplished in the repeater circuit in the same manner as in the selector switches (shown in FIGURES 10*a* and 10*b*). The current paths 961C and 962C are used as inputs to selector switch 261 (see FIGURE 4*a*).

With respect to the repeater circuits as with the selector switches the delays introduced are always identical due to the uniform dimensions of the circuit and furthermore, the simple layout facilitates construction.

*Organization of the Memory Addressing Circuitry*

FIGURES 4*a*, 4*b* and 4*c* (which fit together as shown in FIGURE 4) show the interconnections of circuits 255 to 261. The circuits have been shown in FIGURES 4*a*, 4*b* and 4*c* in a simplified diagrammatic representation. However, since selector switch circuit 255 is shown in the lower right-hand corner of FIGURE 4*c* and repeater circuit 259 is shown in FIGURE 4*a*, the relationship between the representation used in FIGURES 4*a*, 4*b* and 4*c* and the structure of the various selector switches and repeaters as shown in FIGURES 6, 7, 8, 9, 10 and 11 is apparent. The representation used in FIGURES 4*a*, 4*b* and 4*c* was chosen so as to make the interrelationships between the various circuits as clear as possible.

The circuitry shown in FIGURES 4*a*, 4*b* and 4*c* merely represent a portion (i.e., circuits 255 to 261) of the entire memory addressing circuit 107; however, the details of the interconnections of the sections not shown are merely an extension utilizing the same principles as the details of the circuits 255 to 261 which are shown.

The organization of the circuitry is such that the output loops of circuit 255 (FIGURE 4*c*) are the input loops to circuit 256, the output loops of circuits 256 are the input loops of circuit 258, the output loops of circuit 258 are the input loops of circuit 261 (FIGURE 4*b*). Likewise, the output loops of circuit 254 (FIGURE 4*a*) are the input loops of circuit 257, the output loops of circuit 257 are the input loops of circuit 259, and the output loops of circuit 259 are the input loops of circuit 261 (FIGURE 4*b*). This same organization is continued (see FIGURE 2) the output loops of circuit 261 being used as the input loops for circuits 262, 263 and 264. Likewise the A5 to A8 address bit inputs from circuit 128 are combined as shown in FIGURE 2.

FIGURES 4*a*, 4*b* and 4*c* merely show the input and the output loops of the various switching devices. No attempt is made to show the in-line cryotrons in the various circuits nor are the transformer control loops shown. The dots at the intersection of various lines indicate the particular lines between which there is coupling. However, it should be recalled that in order to switch an output line in any loop circuits in any selector switch (as contrasted to the reset lines and to the repeater circuits), current in two input lines is needed. For example, in order to switch the current from one side to the other side of loop 551, it is necessary that there be current in the left-hand branch of both loops 512 and 514.

As can readily be seen from FIGURE 2, the portion of selector switch 107 shown in FIGURES 4*a*, 4*b* and 4*c* receives inputs from the system input circuits 126 and 127, and from the first four bit positions from circuit 128.

Selector switch 255 receives inputs representing the address bits A3, NOT A3, A4 and NOT A4 on input loops 511 to 514 and produces four outputs respectively designated 551 to 554. The various outputs are activated by the following combination of inputs:

| Outputs | Inputs |
|---|---|
| 551 | NOT A3, NOT A4 |
| 552 | A3, NOT A4 |
| 553 | NOT A3, A4 |
| 554 | A3, A4 |

It should be noted that in order to activate any one of the outputs 551 to 554 it is necessary that two of the inputs be activated. As explained with reference to FIGURES 5 to 8, an input signal is applied by switching the current from the right-hand current path in any one of the input loops to the left-hand current path of the respective input loop. An output is indicated in any one of the output loops by switching current from the lower current path in the respective loop to the upper current path in the respective loop.

The four outputs 551 to 554 from circuit 255 are respectfully connected to the inputs 611, 612, 613 and 614 of circuit 256. Circuit 256 also receives two inputs from circuit 128, i.e., the A2 and the NOT A2 inputs.

Selector switch 258 controls eight output loops respectively designated 651 to 658. The outputs are activated by the various inputs as described by the following table. The table also shows what the outputs are equivalent to in terms of the input variables.

| Outputs | Inputs | Equivalent to— |
|---|---|---|
| 651 | 611, A2 | A3, A4, A2 |
| 652 | 612, A2 | NOT A3, A4, A2 |
| 653 | 613, A2 | A3, NOT A4, A2 |
| 654 | 614, A2 | NOT A3, NOT A4, A2 |
| 655 | 611, NOT A2 | A3, A4, NOT A2 |
| 656 | 612, NOT A2 | NOT A3, A4, NOT A2 |
| 657 | 613, NOT A2 | A3, NOT A4, NOT A2 |
| 658 | 614, NOT A2 | NOT A3, NOT A4, NOT A2 |

The eight loops 651 to 658 from circuit 256 respectively control loops 811 to 818 of circuit 258. Circuit 256 activates any particular input 811 to 818 by switching the current from the right-hand current path to the left-hand current path in the particular current loop. Repeater circuit 258 has sixteen outputs respectively designated 851 to 866. The output loops of repeater circuit 258 are arranged in pairs each pair of output loops being associated with one particular input loop. Each pair of output loops is activated when the associated input is activated. The repeater circuit 258 merely takes each output from selector switch 256 and when that particular output loop switches the repeater circuit 258 switches two output loops. For example, input loop 811 switches output loops 851 to 852, input loop 812 switches output loop 853 and 854, etc. The repeater circuit 258 has sixteen outputs (two for each of its eight inputs). The outputs from circuit 258 control the input loops to circuit 261. An output signal is manifested on any particular output loop 851 to 866 by switching current from the bottom to the top current path of the particular current loop. Considering that each loop circuit has a limited fan out capability, the repeater circuit 258 doubles the number of circuits which each output circuit from selector switch 256 can drive.

The other sections of the circuitry shown in FIGURES 4*a*, 4*b* and 4*c* which includes selector switches 254, 257 and 261 and repeater circuit 259 will now be explained.

Selector switch 254 receives three inputs from the systems input circuit 108. The first of these inputs, loop 411, indicates that a write operation is to be performed. The second of these inputs, loop 412, indicates that a "zero" is to be stored in some particular bit storage device, and the third input, loop 413, indicates that a "one" is to be stored in some particular bit storage device. Inputs are supplied to the selector switch circuit 254 by circuits 126 and 127 (FIGURE 2) through control lines (not shown on FIGURES 4*a*, 4*b* and 4*c*) which control cryotron gates 411F, 412F and 413F. Each input current loop has a current source, current sink and two current paths connecting the current source to the current sink. Each current path has a cryotron gating element for introducing resistance into the particular current path.

Selector switch 254 has two loops respectively designated 451 and 452. Loop 451 is switched when both the write signal and the zero data signal are present, and output loop 452 is switched when both the write signal and the one data signal are present.

An output signal is manifested in any particular loop when the current in the particular loop is switched from the bottom current path of the particular loop to the top path. Loops 451 and 452 respectively activate input loops 711 and 712 of selector switch 257.

Selector switch 257 receives the two inputs 711 and 712 which are controlled by selector switch 254 and in addition selector switch 257 receives three other inputs "A1," "NOT A1" and "read" from circuits 126 and 128. The above listed five inputs are combined into six outputs respectively designated 751 to 756.

The particular combination of inputs which switch each output loop is tabulated below. The functions which the various outputs are equivalent to is also shown.

| Output | Input | Equivalent to— |
|---|---|---|
| 751 | 711, A1 | Write Zero, A1 |
| 752 | 711, NOT A1 | Write Zero, NOT A1 |
| 753 | 712, A1 | Write One, A1 |
| 754 | 712, NOT A1 | Write One, NOT A1 |
| 755 | Read, A1 | Read, A1 |
| 756 | Read, NOT A1 | Read, NOT A1 |

The outputs 751 to 756 from selector switch 257 activate inputs 911 to 916 of repeater circuit 259. Repeater circuit 259 duplicates each of the outputs from selector 257 so that repeater circuit 259 has two outputs which are switched each time one of the outputs from selector switch 257 is switched. Output loop 751, input loop 911 and output loops 961 and 962 are shown in detail in FIGURE 11.

It should be noted that although the outputs and inputs of the circuits are referred to as loops, one loop circuit which consists of a current source and a current sink connected by two parallel current paths is in reality an output of one circuit and an input to another circuit. For example, inputs 911 and outputs 751 combine to form one loop circuit which has a single current source 911A and a single current sink 751 B connected by two parallel current paths (see FIGURES 4*a* and 11).

The outputs from repeater circuit 259 and from repeater circuit 258 are used as inputs to selector switch 261. Selector switch 261 receives twelve inputs from repeater circuit 259 and sixteen inputs from repeater circuits 258 and produces three groups of sixteen outputs. For ease in illustration only the first and second and the last output lines in each group of outputs are shown in FIGURE 4*b*.

It should be noted that circuit 261 receives six different inputs from circuit 259 and eight different inputs from circuit 258. Due to repeater circuits 258 and 259 each of the different inputs appears on two input lines. However, the fact that two input lines have the same signal thereon should not confuse the fact that selector switch 261 only receives six independent inputs from circuit 259 and eight independent inputs from circuits 258. Furthermore, the six inputs from circuit 259 can be divided into three groups each having two inputs (see table describing circuit 257). The first of these groups is associated with a write-zero signal, the second of these groups is associated with a write-one signal, and the third of these groups is associated with a read signal. The two lines associated with the write-zero signals are combined with each of the eight independent outputs from circuit 258 to form one group of sixteen output lines, designated as 261N1 to 261N16 (only three of these lines are shown in FIGURE 4*b*).

The two signals from circuit 259 associated with the write-one signals are combined with each of the eight independent outputs from circuit 258 to form a group of sixteen outputs from circuit 261 respectively designated as 261M1 to 261M16 (only three of these lines are shown in FIGURE 4*b*).

The third group of signals from circuit 259 which are associated with the read signals are combined with each of the eight independent outputs from circuit 258 to form a third group of sixteen output circuits from selector switch 261 respectively designated as 261P1 to 261P16 (only three of which are shown on FIGURE 4*b*).

It should be noted that each of the selector switches and repeaters has associated therewith one or more reset input loops. For example, selector switch 255 has a reset loop 515 associated therewith. This reset loop has two current paths connecting a current source to a current sink. Each current path has a cryotron gating element connected in series therewith for introducing resistance into the respective current path. These cryotrons are respectively designated as 515E and 515F. The reset loop 515 is thus reset by some external means which causes cryotron gating element 515E to become resistive thereby switching the current in the reset loop into the right-hand branch. Later when it is desired to reset the various output loops from selector switch 255, cryotron gating element 515F is activated by some external control means thereby introducing resistance into the right-hand current path and switching the current in reset loop 515 into the left-hand current path. The current in the left-hand current path is coupled to control loops which control cryotron gating elements in the top branch of each of the output loops from circuit 255 as previously explained with reference to FIGURES 6, 7, 8, 9 and 10, thereby resetting the current in each loop 551 to 554 into bottom branches of the various output loops. When a particular selector switch or repeater circuit has more than four output loops, more than one reset loop is needed since, due to the fan out limitation, each repeater circuit can only reset four output loops. For example, repeater circuit 258 has sixteen output loops and hence four reset loops respectively designated as 258R1, 258R2, 258R3 and 258R4 are used. Each reset loop is coupled to the top branch of four output loops.

All of the addressing circuitry of memory addressing circuit 107 is deposited on a single substrate, the inputs to each selector switch and repeater circuit being located on one side of substrate and the outputs of the respective selector switches or repeater circuits being located on the second side of the substrate. Since the outputs from each repeater circuit or selector switch connect to the inputs to the next selector switch or repeater circuit, it can be seen that the orientation of the various selector switches and repeater circuits to the substrate alternate. For example, the input lines 511 to 515 of selector switch 255 are on the first side of the substrate and the output lines 551 to 555 from the selector switch 255 are on the second side of the substrate whereas the input lines 611 to 614 of selector switch 256 are on the second side of the substrate and the output lines 651 to 658 from selector switch 256 are on the first side of the substrate. This alternating pattern continues with the input lines 811 to 881 and reset lines 258R1 to 258R3 of repeater circuit 258 being on the first side of the substrate and the output lines 851 to 866 from repeater circuit 258 being on the second side of the substrate.

The orthogonal relationship between the inputs and outputs of each selector circuit and repeater circuit should be noted. This orthogonal relationship coupled with the fact that the inputs and the outputs to the various selector switches and repeater circuits are located on different sides of the substrate combine to make a very compact and easily manufactured circuit possible. Although in FIGURES 4*a*, 4*b* and 4*c* the spacing between the various loops in each circuit has been varied for ease in illustration and in order to fit the desired number of loops on each sheet, it should be understood that in an actual circuit the spacing between these loops will be uniform.

With respect to each side of the substrate of current loops are oriented in only one direction, the current loops on one side of the substrate being in one direction and the current loops on the other side of the substrate being orthogonal thereto. This construction eliminates situations where one line need cross another line thereby introducing objectionable cross coupling. It should also be noted that each of the input circuits and each of the output circuits in each selector switch and repeater circuit is identical in length. Furthermore, in an actual circuit all of the loops in all of the circuits in each stage is made identical. This particular feature greatly facilitates having several sets of signals streaming through the memory addressing circuitry simultaneously, since the delay introduced by each selector switch or repeater circuit is identical, regardless of which particular input to the selector switch or repeater circuit is activated.

*Read-Out Circuitry (FIGURES 12 and 13)*

Each of the two hundred and fifty-six bit storage devices in the memory has an output line. The various output lines from the two hundred and fifty-six bit storage devices are combined in output circuit 109. The reason that a plurality of stages 208 to 212 (see FIGURE 2) are needed to combine the outputs from the two hundred and fifty-six storage devices into one output line 199 is similar to the reason that the fan out capability of the circuitry is limited. As described in detail later, the outut circuitry is logically a plurality of OR circuits. Each of these OR circuits can only have a limited number (four) of inputs if the speed of the circuitry is to be maximized. This can be referred to as a limited fan-in requirement.

The outputs from the bit storage devices are combined in a plurality of four-way OR circuits. FIGURES 12 and 13 show the organization of these OR circuits. In order to facilitate reference between the specification and the drawings the following uniform numbering scheme is used in FIGURES 12 and 13. Each loop circuit is given a designation which begins with the letter "O," for instance O1–1, and the various components in the loop circuits are designated by letters, however the components of any loop circuit will be referred to with the same designation as the loop circuit of which they form a part followed by the letter designating the particular part. For example, one of the current paths in loop circuit O1–1 is referred to as O1–1C and the cryotrons in the current path O1–1C of loop circuit O1–1 are referred to as O1–1E, O1–1F, O1–1G and O1–1H and the reset cryotron in current path O1–1D is referred to as O1–1R. It should further be noted that similar parts in the various OR circuits are designated with the same capital letter. For instance, the current source wire of each OR circuit is designated by the letter A.

As can be seen from FIGURE 2, the output circuitry is arranged in four stages 208 to 211. The number following the "O" in the designation in any loop circuit signifies which stage of the circuitry with which the particular loop is associated with. For example, loop circuit O1–3 is associated with the first stage 208, of the output circuitry 109.

FIGURE 12 shows four OR circuits O1–1 to O1–4 from the first stage 208 of the output circuitry 109 and one OR circuit O2–1 from the second stage 209 of the output circuitry 109. FIGURE 13 shows the third and fourth stages 210 and 211 of the output circuitry 109. Circuit 208A (FIGURE 12) shows in detail how sixteen bit storage devices control one of the cryotron gates O3–1E, in the third stage 210 of the output circuitry 109. Each of the other cryotrons O3–1F to O3–4H in stage 210 (FIGURE 13) is controlled by circuitry 208B to 208P which is similar to circuit 208A which is shown in FIGURE 12; however, each of the other circuit 208B to 208P is activated by a different group of sixteen bit storage devices.

Each OR circuit comprises a current source wire A, a current sink wire B, a first current path C connecting the current source wire to the current sink wire, a second current path D connecting the current source wire to the current sink wire, four sets of cryotrons E, F, G and H connected in series with the first current path, a reset cryotron R connected in series with the second current path and the control winding of an output cryotron connected in series with the second current path. For example, loop circuit O1–1 has a current source wire O1–1A, a current sink wire O1–1B, a first current path O1–1C, a second current path O1–1D, four set cryotrons O1–1E, O1–1F, O1–1G and O1–1H, a reset cryotron O1–1R and the control conductor of an output cryotron O2–1E.

The operation of OR circuit O1–1 will now be explained. It should, however, be understood that the following explanation is equally applicable to any one of the other OR circuits. Initially the circuit is reset by activating the control line for reset cryotron O1–1R, thereby shifting all of the current flowing from current source wire O1–1A to current sink wire O1–1B into current path O1–1C. Once the cryotron has been reset by activating cryotron gating element O1–1R, the current will continue to flow in current path O1–1C until one of the input cryotron gating elements O1–1E to O1–1H is made resistive.

Inputs signals to OR circuit O1–1 are supplied on the control lines for cryotron gating elements O1–1E to O1–1H. An input signal on the control line of any one of the cryotron gating elements O1–1E to O1–1H will introduce resistance into current path O1–1C thereby causing the current which is flowing from current source wire O1–1A to current sink wire O1–1B to shift into current path O1–1D. Current in current path O1–1D also flows through the control line of the output cryotron of the particular stage. That is, current in current path O1–1D flows through the control line for cryotron gating element O2–1E thereby supplying an input to the next stage of the output circuitry. It should be noted that between the time an input signal is applied to the control line of one of the input cryotrons O1–1E to O1–1H and the time that the current in current path O1–1D activates the cryotron gating element O2–1E, there is a slight delay. As will be explained in detail later, the delay inherent in the various stages of the output circuitry is utilized in the same manner as the delays inherent in the various stages of the addressing circuitry 107 in order to allow several information signals to simultaneously progress through the various stages of the output circuitry.

The output circuitry operates as follows: the outputs 120 of the various bit storage devices 106 are connected to the control lines of two hundred and sixty-four input cryotron gates O1–1E to O1–64H (only sixteen input gates O1–1E to O1–4H are shown in FIGURE 12 and the following detailed discussion will be limited to the sixteen inputs shown). When a bit storage device is read out which contains a "one" the respective output line 120 activates one of the cryotron gates O1–1E to O1–4H thereby causing the associated cryotron gating element to become resistive and switching the current from the respective current path C to the respective current path D. Current in current path D activates the input cryotron of the next stage. This in turn switches the current in one of the next loops and repeats the process in the next stage until an output appears on line 199.

Each of the OR circuits has an inherent delay associated therewith. That is, between the time that one of the input cryotrons is activated and the time that the particular OR circuit activates the associated output cryotron, there is a slight time delay. Furthermore, once one of the input cryotrons to an OR circuit has been activated and current has been switched from the respective C path to the respective D path, due to the phenomena of persistent current, the current remains in the respective D path, until the associated reset cryotron is activated. These features allow several information pulses to be progressing through the stages 208 to 211 of the output circuitry simultaneously.

Figure 3:
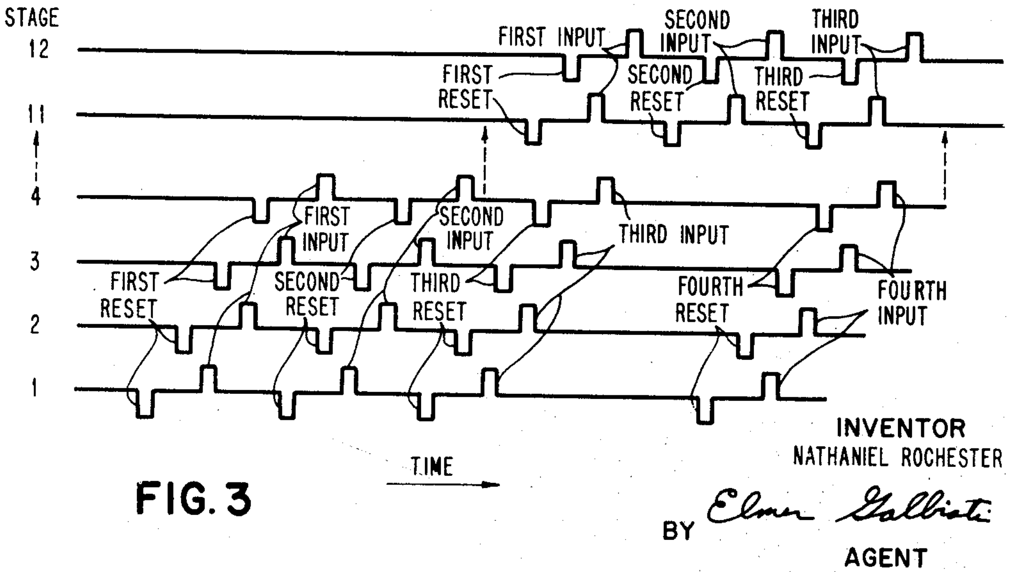
FIGURE 3 is a timing diagram for the addressing circuitry shown in FIGURE 2.

As can be seen from FIGURE 3, the reset cryotrons for the OR circuits in the various stages of the circuitry are reset a slight time before each information pulse arrives at the particular stage of the circuitry. Hence, each stage of the circuitry can receive a new bit of information when the bit of information last processed has passed to the next nonadjacent stage. Once a bit of information has progressed through stage 208 of output circuit 109 and reaches stage 210 of the output circuitry, the first stage 208 can be reset and a second bit of information supplied to input circuitry 208.

*Typical Memory Cell (FIGURE 5)*

The details of the circuitry for each bistable storage device (a representative one of which is shown in FIGURES 1 and 5) will now be explained. Each of the two hundred and fifty-six bistable storage devices in the memory consist of a circuit such as that shown in FIGURE 5. The circuit has a current source wire S01, a current sink wire S02, and two paths S03 and S04 between the current source wire S01 and the current sink wire S02 (note, for ease in reference all numerals designating parts of the storage cell will be preceded by an "S"). The memory cell 200 also has three cryotrons S20, S30 and S40.

Each of the cryotrons S20, S30 and S40 has a gate conductor respectively S21, S31 and S41. Each cryotron also has two control lines, both of which must have current flowing therethrough before the associated gate conductor will be made resistive. The controls for cryotron S20 are control lines S22 and S23, the control lines for cryotrons S30 are control lines S32 and S33 and the control lines for cryotron S40 are control lines S42 and S43. The gate conductor of each cryotron will be resistive if current is flowing in both of the control lines of the respective cryotron.

A "zero" is stored in the respective storage device by simultaneously passing current through lines S22 and S23, thereby making gate S21 resistive and shifting all of the current flowing from current source S01 to current sink S02 into path S04. A "one" is written into the respective storage device by simultaneously passing current through lines S32 and S33 thereby making gate S31 resistive and shifting all of the current flowing from current source S01 to current sink S02 into the path S03.

Data is read from the memory cell by passing current through lines S42. If a "one" is stored in the particular memory cell, current will be flowing in line S43 and the gate conductor S41 will be resistive. If output gate conductor S41 is resistive, it is an indication that current is flowing in line S03, i.e., that a "zero" is stored in the cell whereas if output gate conductor S41 is not resistive it is an indication that current is flowing in line S04 i.e. that a "one" is stored in the particular memory cell.

*Optimization of Fan Out (FIGURES 14 and 15)*

The reason why various switching devices in the addressing circuitry have a limited fan out in order to achieve high speed is explained with reference to the simplified circuit diagrams shown in FIGURES 14 and 15. This is not meant to be a rigorous mathematical analysis of the problems involved. It is merely a brief explanation of why the fan out of the circuit is limited thereby necessitating the use of a multistage circuit with repeater circuits. In order to facilitate reference to the drawings, the various numbers designating the components will be preceded by the letter "F."

The circuit shown in FIGURE 14 is a three-stage circuit each stage of which has one or more inputs and one or more outputs. The first stage has one loop circuit F11 which has one input cryotron F11S, a reset cryotron F11R and four output cryotrons F17S, F18S, F19S and F20S. The second stage has four loop circuits F17, F18, F19 and F20. Each of the circuits F17 to F20 has an input cryotron, a reset cryotron and four output cryotrons. (Note the set and reset cryotrons for each stage are designated by the same designator as the respective loop followed by an R or an S.)

The third stage of the circuitry has twelve loop circuits respectively designated F21 to F36. The loop circuits F21 to F36 are merely shown symbolically in FIGURE 14; however, a representative one of the loop circuits F21 is shown in detail in FIGURE 15. Each of the loop circuits F21 to F36 has an input cryotron gate and four output cryotron gates.

Each of the loop circuits F11, F17, to F20 and F21 to F36 has a current source wire, a current sink wire and two current paths connecting the current source wire to the current sink wire. One of these current paths has the gate conductor of the input cryotron of the respective loop circuit connected in series therewith and the other current path has the gate conductor of the reset cryotron for the particular loop circuit and the control line of the four output cryotron gates connected in series therewith.

Initially the loop circuits are reset by activating the control lines of all of the reset cryotrons, for example, the control line for cryotron F11R, is activated. After all of the reset cryotrons have been activated, the current is in the bottom path in each loop circuit. An input signal is then applied to the control line for cryotron F11S thereby introducing resistance in the bottom current path in control loop F11 and causing the current in control loop of F11 to flow in the top path of the respective control loop. The current in the top path of the control loop F11 flows through the control lines of the input cryotron gates for loop circuits F17 to F20, thereby causing these gates to become resistive and switching the current in these loops to the top path. Control loops F17 to F20 in turn switch control loops F21 to F36, and control loops F21 to F36 control the fourty-eight output cryotron gates.

Within reasonable bounds there is no limit to the number of cryotron gates which one control loop could control. Hence, control loop F11 could be used to directly control the forty-eight output cryotrons in loop F21 to F36, current in the top branch of control loop F11 being connected in series with each of the forty-eight output control lines for the output cryotron F21–1 to F36–4. From a casual observation it would appear that such a circuit would be the fastest circuit possible; however, such is not the case and the multilevel circuit shown in FIGURE 14 is faster than a circuit wherein the output cryotrons are controlled directly by the first loop. The reason for this is explained in mathematical terms in the paragraphs that follow.

In order to find the optimum fan out an expression for the amount of time required to switch a number, N, of output cryotrons is derived in terms of the number of stages, M, and this expression is then differentiated to find a minimum in time relative to the number of stages.

The following symbols are used in the course of the derivation:

N—Number of output cryotron gates which are to be controlled.
C—The number of controls driven by each control loop.
M—The number of stages.
G—The number of gates in each loop.
K—A constant of proportionality indicating the relationship between the inductance associated with a gate and the inductance associated with a control.
S—A constant of proportionality between the inductance of a loop and the time required to switch the loop.

Considering any one particular control loop, there is one input gate and this particular gate controls C output cryotrons each of which may control another gate which in turn can control C more output cryotrons therefore:

(a) $$C^M = N$$

The amount of time required to switch any particular loop is proportional to the inductance of the particular loop and the inductance of any loop consists of the inductance of the gates and the controls in the loop. Since the amount of time required to switch any particular loop is proportional to the inductance of the loop and since the inductance of any loop is equal to the sum of (1) the inductance of the gates in the loop and (2) the inductance of the controls in the loop, it can be seen that the amount of time required to switch a loop is proportional to:

$$(b) \qquad GK+C$$

It should be noted that in actual cryogenic circuits, the inductance does increase with the number of gates and does increase even more with the number of controls in each loop; however, there is no simple linear relationship as that indicated above. The above relationship does approximate the actual relationship and since it leads to results which have been corroborated by actual experiments with the circuits, the use of the equation is justified.

Under the assumption that there are two gates in each loop, the time required to get current into N gates is:

$$(c) \qquad T=SM(2K+C)$$

In order to determine the number of stages M which control the output in the minimum amount of time it is necessary to eliminate M, the number of stages, from the above equation and then to differentiate the above equation with respect to T to find the minimum C. That can be done as follows:

From Equation *a*

$$(d) \qquad M=\frac{\ln N}{\ln C}$$

From Equations *b* and *c*

$$(e) \qquad T=S\frac{\ln N}{\ln C}(2K+C)$$

The problem of minimizing T now becomes the problem of minimizing Equations *e* above.

Let $$(f) \qquad x=\frac{2K+C}{\ln C}$$

and $$(g) \qquad W=\ln C$$

therefore from Equation *f*:

$$(h) \qquad x=\frac{2K+e^W}{W}$$

To find the minimum the expression for *x* which is Equation *h* above is differentiated with respect to W and the result is set equal to zero.

Thus:

$$(i) \qquad K=\frac{W-1}{2}e^W=\frac{(\ln C-1)C}{2}$$

When the above equation is satisfied, the time required to switch various outputs is a minimum. The various values of C and K which satisfy the above equation are tabulated below:

| C | K |
|---|---|
| 2.72 | 0 |
| 3.00 | 0.148 |
| 3.32 | 0.333 |
| 3.43 | 0.400 |
| 3.59 | 0.500 |
| 4.00 | 0.774 |
| 5.00 | 1.520 |
| 6.00 | 2.380 |

The value of K is normally between 0.333 and 0.500. Hence, the optimum fan out is three or four. The addressing circuit 107 was arranged so that the fan out never exceeded four.

The above discussion has merely related to the problem of fan-out, a similar analysis of the problems of fan-in (i.e., the number of inputs which can drive one OR circuit) could be made with similar results.

While the invention has been particularly shown and described with reference to preferred embodiments thereof, it will be understood by those skilled in the art that various changes in form and details may be made therein without departing from the spirit and scope of the invention.

What is claimed is:

1. A cryogenic selector switch having a first layer of circuitry plated on the first side of a substrate and second, third and fourth layers of circuitry plated on the second side of said substrate, said substrate having holes cut therein at selected positions,
   said first layer of circuitry comprising a plurality of input loop circuits, each loop circuit including a current source wire, a current sink wire, first and second current paths connecting said current source wire to said current sink wire, input means for selectively introducing resistance into each second current path, and reset means for introducing resistance into each first current path,
   said second and third layers of circuitry comprising a plurality of closed control loop circuits, each control loop inductively coupled to a first current path of an input loop circuit through a hole in said substrate,
   said fourth layer of circuitry comprising a plurality of output loop circuits each having a current source wire, a current sink wire and first and second current paths connecting said current source wire to said current sink wire, each of said current paths including a cryotron gating element,
   each of said control loops being selectively juxtaposed to each of said cryotron gating elements whereby current in said control loops causes said cryotron gating elements to become resistive.

2. A cryogenic switching device having,
   input circuitry comprising first and second input loop circuits each having a current source wire, a current sink wire, first and second superconducting current paths connecting said current source wire to said current sink wire, and means for selectively introducing resistance into each of said current paths,
   a substrate beneath said input circuitry, said substrate comprising first and second superconducting ground planes separated by a plane of supporting material,
   an output loop circuit beneath said substrate, said output loop circuit having first and second superconducting current paths connecting a current source wire to a current sink wire, one of said current paths including an in-line cryotron gate having two series connected parallel paths,
   first and second superconducting closed loops positioned over substantially the entire length of said in-line cryotron gate, said first superconducting closed loop having a first portion parallel to and beneath said first current path of said first input circuit, said second superconducting loop having a first portion parallel to and beneath said first current path of said second input loop,
   said substrate having holes therein above the first portion of each of said loop circuits, whereby current in the first current path of the first input loop circuit induces current in the first superconducting closed loop, current in the first current path of the second input loop circuit induces current in the second superconducting closed loop, and the magnetic field generated by current in both of said superconducting closed loops is effective to cause said in-line cryotron to become resistive.

3. In a cryogenic selector switch having a plurality of pairs of input lines including a pair of reset lines and a plurality of pairs of output lines, the two lines in each pair of lines forming parallel paths between a current source and a current sink, said input lines being deposited on the first side of a substrate and said output lines being deposited on the second side of said substrate in orthogonal relationship with said input lines, first reset means for introducing resistance into the second line in each pair of input lines to cause the current in each pair of input lines to flow in the first line of each pair of input lines, said current remaining in said first line after said resistance is removed due to the persistent current phenomena, input means for introducing resistance into the first line of selected pairs of input lines to cause the current in each selected pair of input lines to flow in the second line of the respective pair of input lines, a cryotron gating element connected in series with each line of each pair of output lines, a first plurality of loop circuits on the second side of said substrate juxtaposed to the cryotron gating elements in the first line of each pair of output lines, said loop circuits being selectively coupled by induction to the second line of select pairs of input lines through holes in said substrate, a second plurality of loop circuits on the second side of said substrate juxtaposed to the cryotron gating elements in the second line of said output circuits, said second plurality of loop circuits being selectively coupled by induction to the second line of said pair of reset lines, each cryotron gating element being made resistent by current in the control loops juxtaposed therewith.

4. In a cryogenic selector switch having a plurality of pairs of input lines and a plurality of pairs of output lines, the two lines in each pair of lines forming parallel paths between a current source wire and a current sink wire, each pair of input lines associated with an input variable, each pair of output lines associated with an output function of the input variables, each input variable and each output function having first and second possible values respectively designated as zero and one value, current in the first line of any pair of lines indicating the zero value of the associated variable or function and current in the second line of any pair of lines indicating the one value of the associated function or variable;

first reset means for introducing resistance into the second line in each pair of input lines to cause the current in each pair of input lines to flow in the first line of each pair of lines, said current remaining in said first line after said resistance is removed, second reset means for introducing resistance into the second line in each pair of output lines to cause the current in each pair of output lines to flow in the first line of each pair of output lines, said current remaining in said first line after said resistance is removed due to the persistent current phenomena, input means for introducing resistance into the first line of selected pairs of input lines to cause the current in each selected pair of input lines to flow in the second line of the respective pair of input lines, resistance being introduced into the first line of those pairs of lines associated with input variables the value of which is one, coupling means associated with each pair of output lines for introducing resistance into the first line of the respective pair of output lines to cause the current in the respective pair of lines to flow in the second line, each coupling means responsive to current in the second line of selected pairs of input lines, whereby the current in those pairs of output lines associated with functions whose value is one is set into the second line of the respective pair of output lines.

5. In a cryogenic selector switch having a plurality of pairs of input lines including a pair of reset lines and a plurality of pairs of output lines, the two lines in each pair of lines forming parallel paths between a current source and a current sink, first reset means for introducing resistance into the second line in each pair of input lines to cause the current in each pair of input lines to flow in the first line of each pair of lines, said current remaining in said first line after said resistance is removed due to the persistent current phenomena, input means for introducing resistance into the first line of selected pairs of input lines to cause the current in each selected pair of input lines to flow in the second line of the respective pair of input lines, a cryotron gating element connected in each line of each pair of output lines, a first plurality of loop circuits each juxtaposed to a cryotron gating element in a first line of a pair of output lines, said loop circuits being selectively coupled by induction to the second line of selected pairs of input lines, a second plurality of loop circuits each juxtaposed to a cryotron gating element in a second line in a pair of output lines, said loop circuits being coupled by induction to the pair of reset lines, each cryotron gating element being made resistive by current in the control loops juxtaposed therewith.

6. In a cryogenic selector switch having a plurality of pairs of input lines and a plurality of pairs of output lines, the two lines in each pair of lines forming parallel paths between a current source wire and a current sink wire, first reset means for introducing resistance into the second line in each pair of input lines to cause the current in each pair of input lines to flow in the first line of each pair of lines, said current remaining in said first line after said resistance is removed due to the persistent current phenomena, second reset means for introducing resistance into the second line in each pair of output lines to cause the current in each pair of output lines to flow in the first line of each pair of lines, said current remaining in said first line after said resistance is removed due to the persistent current phenomena, input means for introducing resistance into the first line of selected pairs of input lines to cause the current in each selected pair of input lines to flow in the second line of the respective pair of input lines, coupling means associated with the first line of each pair of output lines for introducing resistance into the first line of the respective pair of output lines to cause the current in the respective pair of output lines to flow in the second line of the respective pair of output lines, each coupling means responsive to current in the second line of selected pairs of input lines, said coupling means comprising, a plurality of loop circuits associated with the second line of each pair of input lines, each loop circuit coupled by induction to the associated input lines, a cryotron gate in the first line of each pair of output lines, a plurality of said control loops being juxtaposed with said gating element whereby current in the juxtaposed loop circuits causes the gating element to become resistive, thereby causing the current in the particular pair of output lines to flow in the second line of the particular pair of lines.

7. In a cryogenic selector switch having a plurality of pairs of input lines and a plurality of pairs of output lines, the two lines in each pair of lines forming parallel paths between a current source wire and a current sink wire, first reset means for introducing resistance into the second line in each pair of input lines to cause the current in each pair of input lines to flow in the first line of each pair of lines, said current remaining in said first line after said resistance is removed, second reset means for introducing resistance into the second line in each pair of output lines to cause the current in each pair of output lines to flow in the first line of each pair of lines, said current remaining in said first line after said resistance is removed, input means for introducing resistance into the first line of selected pairs of input lines to cause the current in each selected pair of input lines to flow in the second line of the respective pair of input lines, coupling means associated with each pair of output lines for introducing resistance into the first line of the respective pair of output lines to cause the current in the respective pair of lines to flow in the second line, each coupling means responsive to current in the second line of selected pairs of input lines.

8. In a switching device for controlling N output cryotron gates in response to current in a first control line, each cryotron gate having an associated control line, current in which will activate the respective gate, a plurality of loop circuits each having a current source, a current sink, first and second current paths connecting the current source to the current sink, a reset cryotron gating element connected in series with each first current path, and a set cryotron gating element connected in series with each second current path, each cryotron gating element having an associated control line current in which will cause the associated gating element to become resistive, said loop circuits being arranged in a plurality of stages, the first current path in each loop circuit except the last stage including a plurality (less than C) of control lines of set cryotron gates which are connected in loop circuits in the next respective stage, the first current path of each loop circuit in the last stage including a plurality (C) of control lines of output cryotrons, the inductance associated with each gating element being K times the inductance being associated with each control line, where the number of stages being arranged so that the value of $$\frac{(\ln C-1)C}{2}$$

is as close to the value of K as possible.

References Cited in the file of this patent

UNITED STATES PATENTS 2,981,931 Tate ---------- Apr. 25, 1961